United States Patent
Fritz et al.

(10) Patent No.: US 9,858,902 B2
(45) Date of Patent: Jan. 2, 2018

(54) BIT PLANE MEMORY SYSTEM

(71) Applicant: Brass Roots Technologies, LLC, Plano, TX (US)

(72) Inventors: Matthew John Fritz, Salida, CO (US); Bradley William Walker, Dallas, TX (US)

(73) Assignee: BRASS ROOTS TECHNOLOGIES, LLC, Plano, TX (US)

( * ) Notice: Subject to any disclaimer, the term of this patent is extended or adjusted under 35 U.S.C. 154(b) by 99 days.

(21) Appl. No.: 14/656,143

(22) Filed: Mar. 12, 2015

(65) Prior Publication Data

US 2015/0262557 A1    Sep. 17, 2015

Related U.S. Application Data

(60) Provisional application No. 61/951,942, filed on Mar. 12, 2014.

(51) Int. Cl.
```
G09G 5/395    (2006.01)
H04N 5/937    (2006.01)
G09G 5/393    (2006.01)
```

(52) U.S. Cl.
CPC ............ *G09G 5/395* (2013.01); *G09G 5/393* (2013.01); *H04N 5/937* (2013.01); *G09G 2310/08* (2013.01); *G09G 2340/0435* (2013.01)

(58) Field of Classification Search
CPC .............. G09G 5/395; G09G 5/393; G09G 2340/0435; G09G 2310/08; H04N 5/937
See application file for complete search history.

(56) References Cited

U.S. PATENT DOCUMENTS

| 5,255,100 A | 10/1993 | Urbanus |
| 5,663,749 A | 9/1997 | Farris et al. |
| 6,118,500 A | 9/2000 | Kunzman |
| 6,658,583 B1 * | 12/2003 | Kudo .................... H03K 7/08 332/106 |

(Continued)

FOREIGN PATENT DOCUMENTS

| EP | 0 530 759 | 3/1993 |
| EP | 0 827 129 | 3/1998 |

OTHER PUBLICATIONS

European Patent Office; International Search Report and Written Opinion; PCT Application No. PCT/US2015/020202; dated May 12, 2015.

(Continued)

*Primary Examiner* — Ke Xiao
*Assistant Examiner* — Kim-Thanh T Tran
(74) *Attorney, Agent, or Firm* — Jackson Walker LLP; Christopher J. Rourk; Thomas B. Hayes

(57) ABSTRACT

A data processing system comprising a transpose system configured to receive video ordered pixel data and to generate bit plane blocks of data. A write buffer configured to receive the bit plane blocks of data and to generate bit plane data frames. A memory controller configured to receive the bit plane data frames and to write a first bit plane data frame to a memory while simultaneously reading a second bit plane data frame from memory. A read buffer configured to receive the second bit plane data frame and to convert the second bit plane data frame to a digital display device format.

20 Claims, 28 Drawing Sheets

First Example Embodiment

(56) References Cited

U.S. PATENT DOCUMENTS

| | | | | |
|---|---|---|---|---|
| 2002/0021449 A1* | 2/2002 | Demarest | ............... | G01J 3/45 |
| | | | | 356/498 |
| 2002/0154129 A1* | 10/2002 | Goyins | ............... | G09G 5/001 |
| | | | | 345/540 |
| 2003/0020926 A1* | 1/2003 | Miron | ............... | G02B 6/29358 |
| | | | | 356/519 |
| 2004/0169698 A1* | 9/2004 | Miyajima | ............... | H04N 1/40031 |
| | | | | 347/43 |
| 2005/0001928 A1* | 1/2005 | Takagi | ............... | H04N 19/647 |
| | | | | 348/384.1 |
| 2005/0057479 A1* | 3/2005 | Richards | ............... | G09G 3/346 |
| | | | | 345/98 |
| 2005/0231650 A1* | 10/2005 | Kobori | ............... | G03B 21/2033 |
| | | | | 348/743 |
| 2008/0151195 A1* | 6/2008 | Pacheco | ............... | G03B 21/26 |
| | | | | 353/30 |
| 2008/0297525 A1* | 12/2008 | Rai | ............... | G09G 3/003 |
| | | | | 345/534 |
| 2011/0074792 A1* | 3/2011 | Li | ............... | A61B 8/4411 |
| | | | | 345/519 |
| 2012/0268655 A1* | 10/2012 | MacInnis | ............... | G06F 17/30905 |
| | | | | 348/584 |

OTHER PUBLICATIONS

Morton, G.M.; A Computer Oriented Geodetic Data Base; And a New Technique in File Sequencing; IBM Ltd. Technical Report, Ottawa, Canada, Mar. 1, 1966.

Paeth, A.W.; A Fast Algorithm for General Raster Rotation; Computer Graphics Laboratory, Dec. 31, 1986.

* cited by examiner

Transpose by Rotate and Reorder

Figure 10

4 bit flow thru transpose example  Example nomenclature: 1.03 -> Pixel 1, Bit 3 ; 3.02 -> Pixel 3, Bit 2

| clock | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Source (video order) | 0.00 | 1.00 | 2.00 | 3.00 | 4.00 | 5.00 | 6.00 | 7.00 | 8.00 | 9.00 | 10.00 | 11.00 | | | |
|  | 0.01 | 1.01 | 2.01 | 3.01 | 4.01 | 5.01 | 6.01 | 7.01 | 8.01 | 9.01 | 10.01 | 11.01 | | | |
|  | 0.02 | 1.02 | 2.02 | 3.02 | 4.02 | 5.02 | 6.02 | 7.02 | 8.02 | 9.02 | 10.02 | 11.02 | | | |
|  | 0.03 | 1.03 | 2.03 | 3.03 | 4.03 | 5.03 | 6.03 | 7.03 | 8.03 | 9.03 | 10.03 | 11.03 | | | |

Delay by

| | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0 | 0.00 | 1.00 | 2.00 | 3.00 | 4.00 | 5.00 | 6.00 | 7.00 | 8.00 | 9.00 | 10.00 | 11.00 | | | |
| 1 | | 0.01 | 1.01 | 2.01 | 3.01 | 4.01 | 5.01 | 6.01 | 7.01 | 8.01 | 9.01 | 10.01 | 11.01 | | |
| 2 | | | 0.02 | 1.02 | 2.02 | 3.02 | 4.02 | 5.02 | 6.02 | 7.02 | 8.02 | 9.02 | 10.02 | 11.02 | |
| 3 | | | | 0.03 | 1.03 | 2.03 | 3.03 | 4.03 | 5.03 | 6.03 | 7.03 | 8.03 | 9.03 | 10.03 | 11.03 |

Barrel Shift Down by

| | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
|  | 3 | 2 | 1 | 0 | 3 | 2 | 1 | 0 | 3 | 2 | 1 | 0 | 3 | 2 | 1 |
|  | 0.00 | | 2.00 | 3.00 | 3.01 | 3.02 | 3.03 | 7.00 | 7.01 | 7.02 | 7.03 | 11.00 | 11.01 | 11.02 | 11.03 |
|  | | 1.00 | 1.01 | 2.01 | 2.02 | 2.03 | 6.00 | 6.01 | 6.02 | 6.03 | 10.00 | 10.01 | 10.02 | 10.03 | |
|  | | 0.01 | 0.02 | 1.02 | 1.03 | 5.00 | 5.01 | 5.02 | 5.03 | 9.00 | 9.01 | 9.02 | 9.03 | | |
|  | | | | 0.03 | 4.00 | 4.01 | 4.02 | 4.03 | 8.00 | 8.01 | 8.02 | 8.03 | | | |

Delay by

| | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0 | | | | 3.00 | 3.01 | 3.02 | 3.03 | 7.00 | 7.01 | 7.02 | 7.03 | 11.00 | 11.01 | 11.02 | 11.03 |
| 1 | | | | 2.00 | 2.01 | 2.02 | 2.03 | 6.00 | 6.01 | 6.02 | 6.03 | 10.00 | 10.01 | 10.02 | 10.03 |
| 2 | | | | 1.00 | 1.01 | 1.02 | 1.03 | 5.00 | 5.01 | 5.02 | 5.03 | 9.00 | 9.01 | 9.02 | 9.03 |
| 3 | | | | 0.00 | 0.01 | 0.02 | 0.03 | 4.00 | 4.01 | 4.02 | 4.03 | 8.00 | 8.01 | 8.02 | 8.03 |

Output (bit plane order)

4:1 Dual-Port Memory Address Map

*Figure 13*

Write Addressing — 1301

|  | 0 | 1 | 2 | 3 |
|---|---|---|---|---|
| 0 | BP0 Pixels 0-31 | BP0 Pixels 32-63 | BP0 Pixels 64-95 | BP0 Pixels 96-127 |
| 4 | BP1 Pixels 0-31 | BP1 Pixels 32-63 | BP1 Pixels 64-95 | BP1 Pixels 96-127 |
| 8 | BP2 Pixels 0-31 | BP2 Pixels 32-63 | BP2 Pixels 64-95 | BP2 Pixels 96-127 |
| 12 | BP3 Pixels 0-31 | BP3 Pixels 32-63 | BP3 Pixels 64-95 | BP3 Pixels 96-127 |
| 124 | BP31 Pixels 0-31 | BP31 Pixels 32-63 | BP31 Pixels 64-95 | BP31 Pixels 96-127 |

Write Order — 1303

| 0 | 32 | 64 | 96 |
|---|---|---|---|
| 1 | 33 | 65 | 97 |
| 2 | 34 | 66 | 98 |
| 3 | 35 | 67 | 99 |
| 31 | 63 | 95 | 127 |

Read Addressing — 1302

| 0 | BP0 Pixels 0-127 |
|---|---|
| 1 | BP1 Pixels 0-127 |
| 2 | BP2 Pixels 0-127 |
| 3 | BP3 Pixels 0-127 |
| 31 | BP31 Pixels 0-127 |

Read Order — 1304

| 0 |
|---|
| 1 |
| 2 |
| 3 |
| 31 |

4:1 Write Buffer Address Map

Read Buffer

1:4 Dual-Port Memory Address Map

Memory Controller and SDRAM

Figure 21

SDRAM Address Mapping: Z-Order with Frame Interleave

First Example Embodiment

*Second Example Embodiment*

SDRAM Address Mapping: Second Example Embodiment

Figure 26

| Memory Map (BP.Block) | | | | | | | | | | | | | | | | | | | | | |
|---|---|---|---|---|---|---|---|---|---|---|---|---|---|---|---|---|---|---|---|---|---|
| AddrH | AddrL | | 0 | 1 | 2 | 3 | 15 | 16 | 17 | 31 | 32 | 33 | 47 | 48 | 49 | 95 | 96 | 97 | 111 | 112 | 113 | 127 |
| | Row | Bank | | | | | | | | | | | | | | | | | | | | |
| 0 | 0 | 0 | 0.00 | 0.01 | 0.02 | 0.03 | 0.15 | 1.00 | 1.01 | 1.15 | 2.00 | 2.01 | 2.15 | 3.00 | 3.01 | 5.15 | 6.00 | 6.01 | 6.15 | 7.00 | 7.01 | 7.15 |
| 128 | 0 | 1 | 8.00 | 8.01 | 8.02 | 8.03 | 8.15 | 9.00 | 9.01 | 9.15 | 10.00 | 10.01 | 10.15 | 11.00 | 11.01 | 13.15 | 14.00 | 14.01 | 14.15 | 15.00 | 15.01 | 15.15 |
| 256 | 0 | 2 | 16.00 | 16.01 | 16.02 | 16.03 | 16.15 | 17.00 | 17.01 | 17.15 | 18.00 | 18.01 | 18.15 | 19.00 | 19.01 | 21.15 | 22.00 | 22.01 | 22.15 | 23.00 | 23.01 | 23.15 |
| 384 | 0 | 3 | 24.00 | 24.01 | 24.02 | 24.03 | 24.15 | 25.00 | 25.01 | 25.15 | 26.00 | 26.01 | 26.15 | 27.00 | 27.01 | 29.15 | 30.00 | 30.01 | 30.15 | 31.00 | 31.01 | 31.15 |
| 512 | 0 | 4 | 0.16 | 0.17 | 0.18 | 0.19 | 0.31 | 1.16 | 1.17 | 1.31 | 2.16 | 2.17 | 2.31 | 3.16 | 3.17 | 5.31 | 6.16 | 6.17 | 6.31 | 7.16 | 7.17 | 7.31 |
| 640 | 0 | 5 | 8.16 | 8.17 | 8.18 | 8.19 | 8.31 | 9.16 | 9.17 | 9.31 | 10.16 | 10.17 | 10.31 | 11.16 | 11.17 | 13.31 | 14.16 | 14.17 | 14.31 | 15.16 | 15.17 | 15.31 |
| 768 | 0 | 6 | 16.16 | 16.17 | 16.18 | 16.19 | 16.31 | 17.16 | 17.17 | 17.31 | 18.16 | 18.17 | 18.31 | 19.16 | 19.17 | 21.31 | 22.16 | 22.17 | 22.31 | 23.16 | 23.17 | 23.31 |
| 896 | 0 | 7 | 24.16 | 24.17 | 24.18 | 24.19 | 24.31 | 25.16 | 25.17 | 25.31 | 26.16 | 26.17 | 26.31 | 27.16 | 27.17 | 29.31 | 30.16 | 30.17 | 30.31 | 31.16 | 31.17 | 31.31 |
| 1024 | 1 | 0 | 0.32 | 0.33 | 0.34 | 0.35 | 0.47 | 1.32 | 1.33 | 1.47 | 2.32 | 2.33 | 2.47 | 3.32 | 3.33 | 5.47 | 6.32 | 6.33 | 6.47 | 7.32 | 7.33 | 7.47 |
| 1152 | 1 | 1 | 8.32 | 8.33 | 8.34 | 8.35 | 8.47 | 9.32 | 9.33 | 9.47 | 10.32 | 10.33 | 10.47 | 11.32 | 11.33 | 13.47 | 14.32 | 14.33 | 14.47 | 15.32 | 15.33 | 15.47 |
| 1280 | 1 | 2 | 16.32 | 16.33 | 16.34 | 16.35 | 16.47 | 17.32 | 17.33 | 17.47 | 18.32 | 18.33 | 18.47 | 19.32 | 19.33 | 21.47 | 22.32 | 22.33 | 22.47 | 23.32 | 23.33 | 23.47 |
| 1408 | 1 | 3 | 24.32 | 24.33 | 24.34 | 24.35 | 24.47 | 25.32 | 25.33 | 25.47 | 26.32 | 26.33 | 26.47 | 27.32 | 27.33 | 29.47 | 30.32 | 30.33 | 30.47 | 31.32 | 31.33 | 31.47 |
| 1536 | 1 | 4 | 0.48 | 0.49 | 0.50 | 0.51 | 0.63 | 1.48 | 1.49 | 1.63 | 2.48 | 2.49 | 2.63 | 3.48 | 3.49 | 5.63 | 6.48 | 6.49 | 6.63 | 7.48 | 7.49 | 7.63 |
| 1664 | 1 | 5 | 8.48 | 8.49 | 8.50 | 8.51 | 8.63 | 9.48 | 9.49 | 9.63 | 10.48 | 10.49 | 10.63 | 11.48 | 11.49 | 13.63 | 14.48 | 14.49 | 14.63 | 15.48 | 15.49 | 15.63 |
| 1792 | 1 | 6 | 16.48 | 16.49 | 16.50 | 16.51 | 16.63 | 17.48 | 17.49 | 17.63 | 18.48 | 18.49 | 18.63 | 19.48 | 19.49 | 21.63 | 22.48 | 22.49 | 22.63 | 23.48 | 23.49 | 23.63 |
| 1920 | 1 | 7 | 24.48 | 24.49 | 24.50 | 24.51 | 24.63 | 25.48 | 25.49 | 25.63 | 26.48 | 26.49 | 26.63 | 27.48 | 27.49 | 29.63 | 30.48 | 30.49 | 30.63 | 31.48 | 31.49 | 31.63 |
| 2048 | 2 | 0 | 0.64 | 0.65 | 0.66 | 0.67 | 0.79 | 1.64 | 1.65 | 1.79 | 2.64 | 2.65 | 2.79 | 3.64 | 3.65 | 5.79 | 6.64 | 6.65 | 6.79 | 7.64 | 7.65 | 7.79 |
| 2176 | 2 | 1 | 8.64 | 8.65 | 8.66 | 8.67 | 8.79 | 9.64 | 9.65 | 9.79 | 10.64 | 10.65 | 10.79 | 11.64 | 11.65 | 13.79 | 14.64 | 14.65 | 14.79 | 15.64 | 15.65 | 15.79 |
| 2304 | 2 | 2 | 16.64 | 16.65 | 16.66 | 16.67 | 16.79 | 17.64 | 17.65 | 17.79 | 18.64 | 18.65 | 18.79 | 19.64 | 19.65 | 21.79 | 22.64 | 22.65 | 22.79 | 23.64 | 23.65 | 23.79 |
| 2432 | 2 | 3 | 24.64 | 24.65 | 24.66 | 24.67 | 24.79 | 25.64 | 25.65 | 25.79 | 26.64 | 26.65 | 26.79 | 27.64 | 27.65 | 29.79 | 30.64 | 30.65 | 30.79 | 31.64 | 31.65 | 31.79 |
| 2560 | 2 | 4 | 0.80 | 0.81 | 0.82 | 0.83 | 0.95 | 1.80 | 1.81 | 1.95 | 2.80 | 2.81 | 2.95 | 3.80 | 3.81 | 5.95 | 6.80 | 6.81 | 6.95 | 7.80 | 7.81 | 7.95 |
| 2688 | 2 | 5 | 8.80 | 8.81 | 8.82 | 8.83 | 8.95 | 9.80 | 9.81 | 9.95 | 10.80 | 10.81 | 10.95 | 11.80 | 11.81 | 13.95 | 14.80 | 14.81 | 14.95 | 15.80 | 15.81 | 15.95 |
| 2816 | 2 | 6 | 16.80 | 16.81 | 16.82 | 16.83 | 16.95 | 17.80 | 17.81 | 17.95 | 18.80 | 18.81 | 18.95 | 19.80 | 19.81 | 21.95 | 22.80 | 22.81 | 22.95 | 23.80 | 23.81 | 23.95 |
| 2944 | 2 | 7 | 24.80 | 24.81 | 24.82 | 24.83 | 24.95 | 25.80 | 25.81 | 25.95 | 26.80 | 26.81 | 26.95 | 27.80 | 27.81 | 29.95 | 30.80 | 30.81 | 30.95 | 31.80 | 31.81 | 31.95 |
| 551936 | 539 | 0 | 0.17248 | 0.17249 | 0.17250 | 0.17251 | 0.17263 | 1.17248 | 1.17249 | 1.17263 | 2.17248 | 2.17249 | 2.17263 | 3.17248 | 3.17249 | 5.17263 | 6.17248 | 6.17249 | 6.17263 | 7.17248 | 7.17249 | 7.17263 |
| 552064 | 539 | 1 | 8.17248 | 8.17249 | 8.17250 | 8.17251 | 8.17263 | 9.17248 | 9.17249 | 9.17263 | 10.17248 | 10.17249 | 10.17263 | 11.17248 | 11.17249 | 13.17263 | 14.17248 | 14.17249 | 14.17263 | 15.17248 | 15.17249 | 15.17263 |
| 552192 | 539 | 2 | 16.17248 | 16.17249 | 16.17250 | 16.17251 | 16.17263 | 17.17248 | 17.17249 | 17.17263 | 18.17248 | 18.17249 | 18.17263 | 19.17248 | 19.17249 | 21.17263 | 22.17248 | 22.17249 | 22.17263 | 23.17248 | 23.17249 | 23.17263 |
| 552320 | 539 | 3 | 24.17248 | 24.17249 | 24.17250 | 24.17251 | 24.17263 | 25.17248 | 25.17249 | 25.17263 | 26.17248 | 26.17249 | 26.17263 | 27.17248 | 27.17249 | 29.17263 | 30.17248 | 30.17249 | 30.17263 | 31.17248 | 31.17249 | 31.17263 |
| 552448 | 539 | 4 | 0.17264 | 0.17265 | 0.17266 | 0.17267 | 0.17279 | 1.17264 | 1.17265 | 1.17279 | 2.17264 | 2.17265 | 2.17279 | 3.17264 | 3.17265 | 5.17279 | 6.17264 | 6.17265 | 6.17279 | 7.17264 | 7.17265 | 7.17279 |
| 552576 | 539 | 5 | 8.17264 | 8.17265 | 8.17266 | 8.17267 | 8.17279 | 9.17264 | 9.17265 | 9.17279 | 10.17264 | 10.17265 | 10.17279 | 11.17264 | 11.17265 | 13.17279 | 14.17264 | 14.17265 | 14.17279 | 15.17264 | 15.17265 | 15.17279 |
| 552704 | 539 | 6 | 16.17264 | 16.17265 | 16.17266 | 16.17267 | 16.17279 | 17.17264 | 17.17265 | 17.17279 | 18.17264 | 18.17265 | 18.17279 | 19.17264 | 19.17265 | 21.17279 | 22.17264 | 22.17265 | 22.17279 | 23.17264 | 23.17265 | 23.17279 |
| 552832 | 539 | 7 | 24.17264 | 24.17265 | 24.17266 | 24.17267 | 24.17279 | 25.17264 | 25.17265 | 25.17279 | 26.17264 | 26.17265 | 26.17279 | 27.17264 | 27.17265 | 29.17279 | 30.17264 | 30.17265 | 30.17279 | 31.17264 | 31.17265 | 31.17279 |

Figure 27

| Write Order | | | | | | | | | | | | | | | | | | |
|---|---|---|---|---|---|---|---|---|---|---|---|---|---|---|---|---|---|---|
| | Column | 0 | 1 | 2 | 3 | 15 | 16 | 17 | 31 | 32 | 33 | 47 | 48 | 49 | 95 | 96 | 97 | 111 | 112 | 113 | 127 |
| Addr | Row | Bank | | | | | | | | | | | | | | | | | | | |
| 0 | 0 | 0 | 0 | 32 | 64 | 96 | 480 | 1 | 33 | 481 | 2 | 34 | 482 | 3 | 35 | 485 | 6 | 38 | 486 | 7 | 39 | 487 |
| 128 | 0 | 1 | 8 | 40 | 72 | 104 | 488 | 9 | 41 | 489 | 10 | 42 | 490 | 11 | 43 | 493 | 14 | 46 | 494 | 15 | 47 | 495 |
| 256 | 0 | 2 | 16 | 48 | 80 | 112 | 496 | 17 | 49 | 497 | 18 | 50 | 498 | 19 | 51 | 501 | 22 | 54 | 502 | 23 | 55 | 503 |
| 384 | 0 | 3 | 24 | 56 | 88 | 120 | 504 | 25 | 57 | 505 | 26 | 58 | 506 | 27 | 59 | 509 | 30 | 62 | 510 | 31 | 63 | 511 |
| 512 | 0 | 4 | 512 | 544 | 576 | 608 | 992 | 513 | 545 | 993 | 514 | 546 | 994 | 515 | 547 | 997 | 518 | 550 | 998 | 519 | 551 | 999 |
| 640 | 0 | 5 | 520 | 552 | 584 | 616 | 1000 | 521 | 553 | 1001 | 522 | 554 | 1002 | 523 | 555 | 1005 | 526 | 558 | 1006 | 527 | 559 | 1007 |
| 768 | 0 | 6 | 528 | 560 | 592 | 624 | 1008 | 529 | 561 | 1009 | 530 | 562 | 1010 | 531 | 563 | 1013 | 534 | 566 | 1014 | 535 | 567 | 1015 |
| 896 | 0 | 7 | 536 | 568 | 600 | 632 | 1016 | 537 | 569 | 1017 | 538 | 570 | 1018 | 539 | 571 | 1021 | 542 | 574 | 1022 | 543 | 575 | 1023 |
| 1024 | 1 | 0 | 1024 | 1056 | 1088 | 1120 | 1504 | 1025 | 1057 | 1505 | 1026 | 1058 | 1506 | 1027 | 1059 | 1509 | 1030 | 1062 | 1510 | 1031 | 1063 | 1511 |
| 1152 | 1 | 1 | 1032 | 1064 | 1096 | 1128 | 1512 | 1033 | 1065 | 1513 | 1034 | 1066 | 1514 | 1035 | 1067 | 1517 | 1038 | 1070 | 1518 | 1039 | 1071 | 1519 |
| 1280 | 1 | 2 | 1040 | 1072 | 1104 | 1136 | 1520 | 1041 | 1073 | 1521 | 1042 | 1074 | 1522 | 1043 | 1075 | 1525 | 1046 | 1078 | 1526 | 1047 | 1079 | 1527 |
| 1408 | 1 | 3 | 1048 | 1080 | 1112 | 1144 | 1528 | 1049 | 1081 | 1529 | 1050 | 1082 | 1530 | 1051 | 1083 | 1533 | 1054 | 1086 | 1534 | 1055 | 1087 | 1535 |
| 1536 | 1 | 4 | 1536 | 1568 | 1600 | 1632 | 2016 | 1537 | 1569 | 2017 | 1538 | 1570 | 2018 | 1539 | 1571 | 2021 | 1542 | 1574 | 2022 | 1543 | 1575 | 2023 |
| 1664 | 1 | 5 | 1544 | 1576 | 1608 | 1640 | 2024 | 1545 | 1577 | 2025 | 1546 | 1578 | 2026 | 1547 | 1579 | 2029 | 1550 | 1582 | 2030 | 1551 | 1583 | 2031 |
| 1792 | 1 | 6 | 1552 | 1584 | 1616 | 1648 | 2032 | 1553 | 1585 | 2033 | 1554 | 1586 | 2034 | 1555 | 1587 | 2037 | 1558 | 1590 | 2038 | 1559 | 1591 | 2039 |
| 1920 | 1 | 7 | 1560 | 1592 | 1624 | 1656 | 2040 | 1561 | 1593 | 2041 | 1562 | 1594 | 2042 | 1563 | 1595 | 2045 | 1566 | 1598 | 2046 | 1567 | 1599 | 2047 |
| 2048 | 2 | 0 | 2048 | 2080 | 2112 | 2144 | 2528 | 2049 | 2081 | 2529 | 2050 | 2082 | 2530 | 2051 | 2083 | 2533 | 2054 | 2086 | 2534 | 2055 | 2087 | 2535 |
| 2176 | 2 | 1 | 2056 | 2088 | 2120 | 2152 | 2536 | 2057 | 2089 | 2537 | 2058 | 2090 | 2538 | 2059 | 2091 | 2541 | 2062 | 2094 | 2542 | 2063 | 2095 | 2543 |
| 2304 | 2 | 2 | 2064 | 2096 | 2128 | 2160 | 2544 | 2065 | 2097 | 2545 | 2066 | 2098 | 2546 | 2067 | 2099 | 2549 | 2070 | 2102 | 2550 | 2071 | 2103 | 2551 |
| 2432 | 2 | 3 | 2072 | 2104 | 2136 | 2168 | 2552 | 2073 | 2105 | 2553 | 2074 | 2106 | 2554 | 2075 | 2107 | 2557 | 2078 | 2110 | 2558 | 2079 | 2111 | 2559 |
| 2560 | 2 | 4 | 2560 | 2592 | 2624 | 2656 | 3040 | 2561 | 2593 | 3041 | 2562 | 2594 | 3042 | 2563 | 2595 | 3045 | 2566 | 2598 | 3046 | 2567 | 2599 | 3047 |
| 2688 | 2 | 5 | 2568 | 2600 | 2632 | 2664 | 3048 | 2569 | 2601 | 3049 | 2570 | 2602 | 3050 | 2571 | 2603 | 3053 | 2574 | 2606 | 3054 | 2575 | 2607 | 3055 |
| 2816 | 2 | 6 | 2576 | 2608 | 2640 | 2672 | 3056 | 2577 | 2609 | 3057 | 2578 | 2610 | 3058 | 2579 | 2611 | 3061 | 2582 | 2614 | 3062 | 2583 | 2615 | 3063 |
| 2944 | 2 | 7 | 2584 | 2616 | 2648 | 2680 | 3064 | 2585 | 2617 | 3065 | 2586 | 2618 | 3066 | 2587 | 2619 | 3069 | 2590 | 2622 | 3070 | 2591 | 2623 | 3071 |
| 551936 | 539 | 0 | 551936 | 551968 | 552000 | 552032 | 552416 | 551937 | 551969 | 552417 | 551938 | 551970 | 552418 | 551939 | 551971 | 552421 | 551942 | 551974 | 552422 | 551943 | 551975 | 552423 |
| 552064 | 539 | 1 | 551944 | 551976 | 552008 | 552040 | 552424 | 551945 | 551977 | 552425 | 551946 | 551978 | 552426 | 551947 | 551979 | 552429 | 551950 | 551982 | 552430 | 551951 | 551983 | 552431 |
| 552192 | 539 | 2 | 551952 | 551984 | 552016 | 552048 | 552432 | 551953 | 551985 | 552433 | 551954 | 551986 | 552434 | 551955 | 551987 | 552437 | 551958 | 551990 | 552438 | 551959 | 551991 | 552439 |
| 552320 | 539 | 3 | 551960 | 551992 | 552024 | 552056 | 552440 | 551961 | 551993 | 552441 | 551962 | 551994 | 552442 | 551963 | 551995 | 552445 | 551966 | 551998 | 552446 | 551967 | 551999 | 552447 |
| 552448 | 539 | 4 | 552448 | 552480 | 552512 | 552544 | 552928 | 552449 | 552481 | 552929 | 552450 | 552482 | 552930 | 552451 | 552483 | 552933 | 552454 | 552486 | 552934 | 552455 | 552487 | 552935 |
| 552576 | 539 | 5 | 552456 | 552488 | 552520 | 552552 | 552936 | 552457 | 552489 | 552937 | 552458 | 552490 | 552938 | 552459 | 552491 | 552941 | 552462 | 552494 | 552942 | 552463 | 552495 | 552943 |
| 552704 | 539 | 6 | 552464 | 552496 | 552528 | 552560 | 552944 | 552465 | 552497 | 552945 | 552466 | 552498 | 552946 | 552467 | 552499 | 552949 | 552470 | 552502 | 552950 | 552471 | 552503 | 552951 |
| 552832 | 539 | 7 | 552472 | 552504 | 552536 | 552568 | 552952 | 552473 | 552505 | 552953 | 552474 | 552506 | 552954 | 552475 | 552507 | 552957 | 552478 | 552510 | 552958 | 552479 | 552511 | 552959 |

Figure 28

| Read Order | | | | | | | | | | | | | | | | | | | |
|---|---|---|---|---|---|---|---|---|---|---|---|---|---|---|---|---|---|---|---|
| | Column | 0 | 1 | 2 | 3 | 15 | 16 | 17 | 31 | 32 | 33 | 47 | 48 | 49 | 95 | 96 | 97 | 111 | 112 | 113 | 127 |
| Addr | Row | Bank | | | | | | | | | | | | | | | | | | | |
| 0 | 0 | 0 | 0 | 1 | 2 | 3 | 15 | 17280 | 17281 | 17295 | 34560 | 34561 | 34575 | 51840 | 51841 | 86415 | 103680 | 103681 | 103695 | 120960 | 120961 | 120975 |
| 128 | 0 | 1 | 138240 | 138241 | 138242 | 138243 | 138255 | 155520 | 155521 | 155535 | 172800 | 172801 | 172815 | 190080 | 190081 | 224655 | 241920 | 241921 | 241935 | 259200 | 259201 | 259215 |
| 256 | 0 | 2 | 276480 | 276481 | 276482 | 276483 | 276495 | 293760 | 293761 | 293775 | 311040 | 311041 | 311055 | 328320 | 328321 | 362895 | 380160 | 380161 | 380175 | 397440 | 397441 | 397455 |
| 384 | 0 | 3 | 414720 | 414721 | 414722 | 414723 | 414735 | 432000 | 432001 | 432015 | 449280 | 449281 | 449295 | 466560 | 466561 | 501135 | 518400 | 518401 | 518415 | 535680 | 535681 | 535695 |
| 512 | 0 | 4 | 16 | 17 | 18 | 19 | 31 | 17296 | 17297 | 17311 | 34576 | 34577 | 34591 | 51856 | 51857 | 86431 | 103696 | 103697 | 103711 | 120976 | 120977 | 120991 |
| 640 | 0 | 5 | 138256 | 138257 | 138258 | 138259 | 138271 | 155536 | 155537 | 155551 | 172816 | 172817 | 172831 | 190096 | 190097 | 224671 | 241936 | 241937 | 241951 | 259216 | 259217 | 259231 |
| 768 | 0 | 6 | 276496 | 276497 | 276498 | 276499 | 276511 | 293776 | 293777 | 293791 | 311056 | 311057 | 311071 | 328336 | 328337 | 362911 | 380176 | 380177 | 380191 | 397456 | 397457 | 397471 |
| 896 | 0 | 7 | 414736 | 414737 | 414738 | 414739 | 414751 | 432016 | 432017 | 432031 | 449296 | 449297 | 449311 | 466576 | 466577 | 501151 | 518416 | 518417 | 518431 | 535696 | 535697 | 535711 |
| 1024 | 1 | 0 | 32 | 33 | 34 | 35 | 47 | 17312 | 17313 | 17327 | 34592 | 34593 | 34607 | 51872 | 51873 | 86447 | 103712 | 103713 | 103727 | 120992 | 120993 | 121007 |
| 1152 | 1 | 1 | 138272 | 138273 | 138274 | 138275 | 138287 | 155552 | 155553 | 155567 | 172832 | 172833 | 172847 | 190112 | 190113 | 224687 | 241952 | 241953 | 241967 | 259232 | 259233 | 259247 |
| 1280 | 1 | 2 | 276512 | 276513 | 276514 | 276515 | 276527 | 293792 | 293793 | 293807 | 311072 | 311073 | 311087 | 328352 | 328353 | 362927 | 380192 | 380193 | 380207 | 397472 | 397473 | 397487 |
| 1408 | 1 | 3 | 414752 | 414753 | 414754 | 414755 | 414767 | 432032 | 432033 | 432047 | 449312 | 449313 | 449327 | 466592 | 466593 | 501167 | 518432 | 518433 | 518447 | 535712 | 535713 | 535727 |
| 1536 | 1 | 4 | 48 | 49 | 50 | 51 | 63 | 17328 | 17329 | 17343 | 34608 | 34609 | 34623 | 51888 | 51889 | 86463 | 103728 | 103729 | 103743 | 121008 | 121009 | 121023 |
| 1664 | 1 | 5 | 138288 | 138289 | 138290 | 138291 | 138303 | 155568 | 155569 | 155583 | 172848 | 172849 | 172863 | 190128 | 190129 | 224703 | 241968 | 241969 | 241983 | 259248 | 259249 | 259263 |
| 1792 | 1 | 6 | 276528 | 276529 | 276530 | 276531 | 276543 | 293808 | 293809 | 293823 | 311088 | 311089 | 311103 | 328368 | 328369 | 362943 | 380208 | 380209 | 380223 | 397488 | 397489 | 397503 |
| 1920 | 1 | 7 | 414768 | 414769 | 414770 | 414771 | 414783 | 432048 | 432049 | 432063 | 449328 | 449329 | 449343 | 466608 | 466609 | 501183 | 518448 | 518449 | 518463 | 535728 | 535729 | 535743 |
| 2048 | 2 | 0 | 64 | 65 | 66 | 67 | 79 | 17344 | 17345 | 17359 | 34624 | 34625 | 34639 | 51904 | 51905 | 86479 | 103744 | 103745 | 103759 | 121024 | 121025 | 121039 |
| 2176 | 2 | 1 | 138304 | 138305 | 138306 | 138307 | 138319 | 155584 | 155585 | 155599 | 172864 | 172865 | 172879 | 190144 | 190145 | 224719 | 241984 | 241985 | 241999 | 259264 | 259265 | 259279 |
| 2304 | 2 | 2 | 276544 | 276545 | 276546 | 276547 | 276559 | 293824 | 293825 | 293839 | 311104 | 311105 | 311119 | 328384 | 328385 | 362959 | 380224 | 380225 | 380239 | 397504 | 397505 | 397519 |
| 2432 | 2 | 3 | 414784 | 414785 | 414786 | 414787 | 414799 | 432064 | 432065 | 432079 | 449344 | 449345 | 449359 | 466624 | 466625 | 501199 | 518464 | 518465 | 518479 | 535744 | 535745 | 535759 |
| 2560 | 2 | 4 | 80 | 81 | 82 | 83 | 95 | 17360 | 17361 | 17375 | 34640 | 34641 | 34655 | 51920 | 51921 | 86495 | 103760 | 103761 | 103775 | 121040 | 121041 | 121055 |
| 2688 | 2 | 5 | 138320 | 138321 | 138322 | 138323 | 138335 | 155600 | 155601 | 155615 | 172880 | 172881 | 172895 | 190160 | 190161 | 224735 | 242000 | 242001 | 242015 | 259280 | 259281 | 259295 |
| 2816 | 2 | 6 | 276560 | 276561 | 276562 | 276563 | 276575 | 293840 | 293841 | 293855 | 311120 | 311121 | 311135 | 328400 | 328401 | 362975 | 380240 | 380241 | 380255 | 397520 | 397521 | 397535 |
| 2944 | 2 | 7 | 414800 | 414801 | 414802 | 414803 | 414815 | 432080 | 432081 | 432095 | 449360 | 449361 | 449375 | 466640 | 466641 | 501215 | 518480 | 518481 | 518495 | 535760 | 535761 | 535775 |
| 551936 | 539 | 0 | 17248 | 17249 | 17250 | 17251 | 17263 | 34528 | 34529 | 34543 | 51808 | 51809 | 51823 | 69088 | 69089 | 103663 | 120928 | 120929 | 120943 | 138208 | 138209 | 138223 |
| 552064 | 539 | 1 | 155488 | 155489 | 155490 | 155491 | 155503 | 172768 | 172769 | 172783 | 190048 | 190049 | 190063 | 207328 | 207329 | 241903 | 259168 | 259169 | 259183 | 276448 | 276449 | 276463 |
| 552192 | 539 | 2 | 293728 | 293729 | 293730 | 293731 | 293743 | 311008 | 311009 | 311023 | 328288 | 328289 | 328303 | 345568 | 345569 | 380143 | 397408 | 397409 | 397423 | 414688 | 414689 | 414703 |
| 552320 | 539 | 3 | 431968 | 431969 | 431970 | 431971 | 431983 | 449248 | 449249 | 449263 | 466528 | 466529 | 466543 | 483808 | 483809 | 518383 | 535648 | 535649 | 535663 | 552928 | 552929 | 552943 |
| 552448 | 539 | 4 | 17264 | 17265 | 17266 | 17267 | 17279 | 34544 | 34545 | 34559 | 51824 | 51825 | 51839 | 69104 | 69105 | 103679 | 120944 | 120945 | 120959 | 138224 | 138225 | 138239 |
| 552576 | 539 | 5 | 155504 | 155505 | 155506 | 155507 | 155519 | 172784 | 172785 | 172799 | 190064 | 190065 | 190079 | 207344 | 207345 | 241919 | 259184 | 259185 | 259199 | 276464 | 276465 | 276479 |
| 552704 | 539 | 6 | 293744 | 293745 | 293746 | 293747 | 293759 | 311024 | 311025 | 311039 | 328304 | 328305 | 328319 | 345584 | 345585 | 380159 | 397424 | 397425 | 397439 | 414704 | 414705 | 414719 |
| 552832 | 539 | 7 | 431984 | 431985 | 431986 | 431987 | 431999 | 449264 | 449265 | 449279 | 466544 | 466545 | 466559 | 483824 | 483825 | 518399 | 535664 | 535665 | 535679 | 552944 | 552945 | 552959 |

BIT PLANE MEMORY SYSTEM

RELATED APPLICATIONS

The present application claims priority to U.S. Provisional Patent Application No. 61/951,942, filed Mar. 12, 2014, which is hereby incorporated by reference for all purposes as if set forth herein in its entirety.

TECHNICAL FIELD

The present disclosure pertains generally to image display systems using display devices, including spatial light modulators and emissive displays, and more particularly, to formatting, storing, and delivering data to the display or modulator.

BACKGROUND OF THE INVENTION

Display devices convert electrical signals into light levels that make up a displayed image. Digital display devices are a subset of display devices, and are capable of displaying a finite number of discrete light levels, or gray shades, at any instance in time. Binary (two state) displays are a subset of digital display devices that can display only two light levels at any instance in time, the two light levels being fully on or fully off.

Video display devices can show a sequence of images, providing the appearance of moving pictures. Video display devices can be analog, digital, or binary.

Examples of digital display devices include: the Digital Micromirror Device (DMD) from Texas Instruments (Dallas, Tex.), the Digital Liquid Crystal on Silicon (D-LCOS) device, the VueG8 technology from Syndiant (Dallas, Tex.), and the Plasma Display Panel (PDP), and light emitting diode (LED) displays. Some analog imaging devices can also be operated as a digital display, including the D-ILA device from JVC-Kenwood (Kanagawa, Japan).

A video source provides video signals to a display. The video is comprised of a sequence of images, or frames. Video signals can be analog or digital and can be converted between analog and digital forms.

An image or video frame is composed of rows and columns of pixels. The rows are also referred to as lines. Each pixel of a digital video frame has associated data that represents the light intensity and, in multicolor displays, the color of the pixel. The data is comprised of one or more binary bits (zeroes or ones). The value each bit represents may be a binary weighting (powers of 2), or some other, possibly arbitrary, weighting.

The typical structure of digital video feeding a display is a stream of digital values representing the light level to be displayed for each video pixel. Typically, the order of the pixels in the stream is from left to right for an entire line (i.e. row) and then moving down one line and repeating for every line in the display. This ordering of pixels is referred to herein as "video order."

Each image, or video frame, is displayed for an amount of time called the frame time. The frame time can be subdivided into time slots, known as bit segments. A digital display shows each bit segment for an amount of time that is proportional to the desired weight of the bit segment. The bit segments can be all the same weight (i.e. length in time), or they can vary by segment. If the illumination is variable, this will also affect the weight of the bit segments. Some digital displays (e.g. DMD) can produce shorter bit segments if one or more adjacent bit segments are lengthened. Short bit segments are desired for high effective bit depth, but require more data bandwidth and device speed.

SUMMARY OF THE INVENTION

One aspect of the present disclosure is a bit plane memory system using SDRAM while achieving high efficiency. The bit plane memory system converts video ordered image data to bit plane ordered data, stores it to SDRAM, and then reads it out as bit planes to supply data to a digital imaging device. The system comprises several processing blocks, including transpose, write buffer, memory controller, SDRAM, and read buffer. The transpose, write buffer, and memory controller each perform part of the function of transforming video-ordered pixel data into bit plane data. A unified memory structure may be used, instead of a double buffer structure, avoiding duplication of controllers, memories, buffers, and other resources.

An advantage of the disclosure is that it enables the use of standard SDRAM for data storage. While many different types of memory could be used in a bit plane memory system, DDR3 is desirable because it has large storage capacity, low cost, high speed, and is readily available. However, using DDR3 requires special care to construct a memory system structure and control scheme to avoid excessive overhead that wastes memory bandwidth. For the implementation of high performance video display systems at a reasonable cost, memory efficiencies above 90% are desired.

Note that the present disclosure could instead use DDR2 memory, with slight performance reductions and perhaps some increase in cost. Newer and planned versions of DDR SDRAM, such as DDR4 and successors, can also be used effectively with the techniques disclosed herein.

An example embodiment of the disclosure is a DDR3-based bit plane memory system that operates with memory efficiency (bus utilization) greater than 94%.

BRIEF DESCRIPTION OF DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which:

FIG. 10 shows a timing diagram of an idealized 4-bit transpose, showing input versus output;

FIG. 13 shows an example address mapping for a write buffer;

FIG. 21 shows the transformation from separate plane and chunk numbers to z-order;

FIG. 26 shows a mapping of bit plane number and chunk number to SDRAM locations;

FIG. 27 shows the order in which bit plane chunks are written into a DDR3 SDRAM;

FIG. 28 shows the order in which bit plane chunks are read from a DDR3 SDRAM.

DETAILED DESCRIPTION OF THE INVENTION

Figure 1:
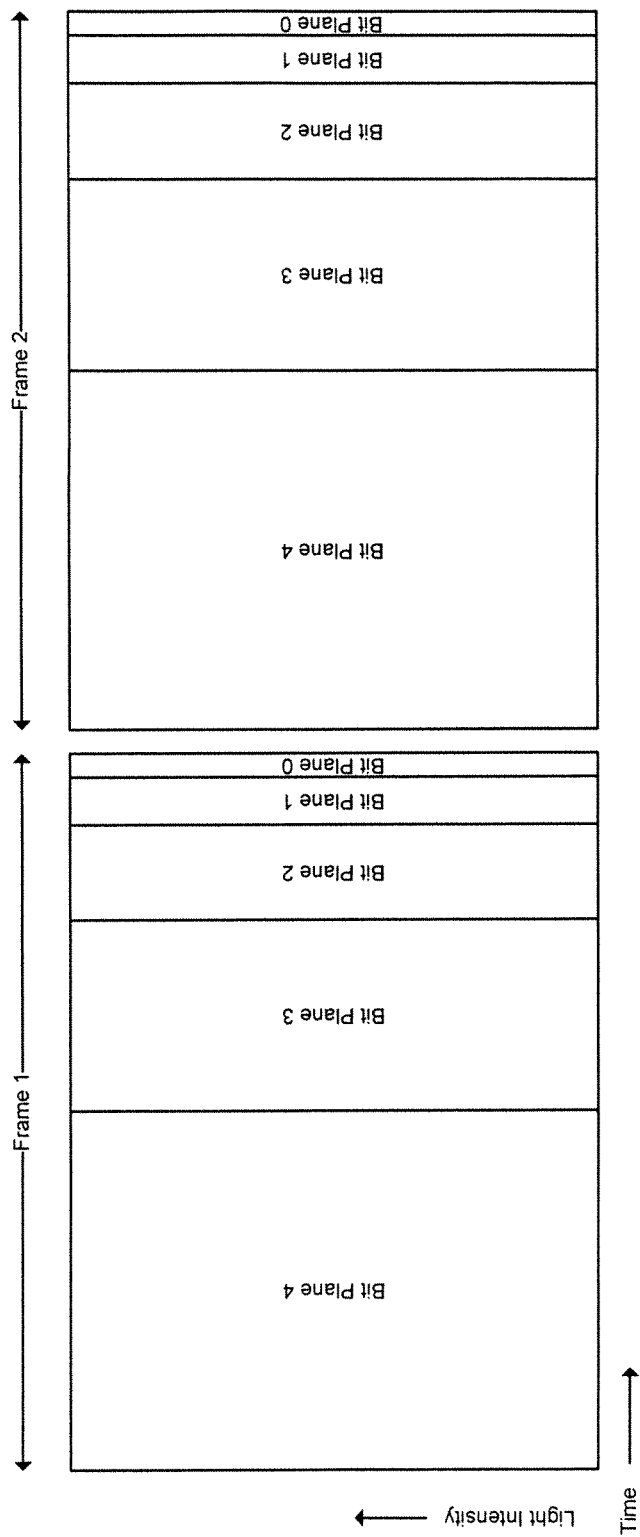
FIG. 1 is a view of bit planes contained in two video frames.

In the description that follows, like parts are marked throughout the specification and drawings with the same reference numerals. The drawing figures might not be to scale and certain components can be shown in generalized or schematic form and identified by commercial designations in the interest of clarity and conciseness.

In order to enable a digital display system to show more gray shades than the intrinsic capabilities of the digital imaging device, some sort of modulation in time of the digital imaging device can be used (e.g. pulse width modulation, or PWM). Typically, the digital imaging device is modulated with a signal such that the intensities of the displayed pixels average to the desired gray shade over a time frame short enough that the human vision system will perceive these average pixel levels, rather than the modulated signal.

One approach to generating this digital imaging device modulating signal is to convert the incoming video levels into bit planes. A bit plane may also be referred to as a plane. If each pixel is represented by an N-bit value, each image frame will have N bit planes. Each bit plane represents a portion of the video level. This portion of the video level is typically referred to as the weight, or bit weight, of the bit plane. Bit weights are often binary (i.e. powers of two), but are not limited to binary ratios. For example, a binary 4-bit video signal may have 4 bit planes, with bit weights of 0.5, 0.25, 0.125, and 0.0625. Equivalently, the weights may be stated in integer form: (8, 4, 2, and 1), as it is the ratio of the bit weights that is the salient aspect.

A bit plane comprises one bit of the incoming video data for every pixel within the video frame. For example, every pixel could show bit 3 of the associated video data. Each bit plane is displayed in one or more bit segments, with the weight of each bit plane being equal to the sum of the weights of the associated bit segments. A bit plane that is shown in more than one bit segment in a given frame is said to be 'split' or 'repeated'. The weight of a bit plane is proportional to both the length of time each bit plane is displayed, as well the integral of the illumination during the bit plane display. For a binary display, during a bit segment, the pixels will be ON or OFF depending on the related bit plane data.

The arrangement of the bit segments in time and their associated bit weights and bit planes is called the bit sequence (the "sequence"). The design of bit sequences involves reconciling various aspects of display image quality, including bit depth, dither noise, bandwidth, light efficiency, color artifacts, and motion artifacts.

Using multi-level halftoning (multitoning), the incoming image data can be converted to a representation using more, or fewer, bits per pixel. Multitoning can also convert from a binary (bits are powers of 2) representation to a representation with arbitrary weights per bit. This provides the ability to use arbitrary numbers of bit planes, with arbitrary bit weights.

Typically, not all possible combinations of bit planes are used. For example, a cinema display running at 24 frames per second and using a DMD with an average bit segment of 170 us can display about 260 bit segments per frame. Using one bit plane per bit segment, if every possible combination of bit planes was used, there would be $2^{260}$ combinations, or about $10^{78}$. This is obviously more than is required or practical. In addition, many combinations are redundant, as they have the same or very similar bit weight. In practice, a subset of combinations is chosen, with a total count ranging from dozens to hundreds of combinations. Each chosen combination of bit planes, termed a "bit code," has an aggregate bit weight, and thus a gray level, as well as a bit vector representing the bit planes that should be ON, or '1'.

A bit plane memory system converts the incoming video stream from video order to bit plane order, stores the bit planes in memory, and recalls the bit planes from memory in the order required by the bit sequence, and sends the bit plane data to the display device.

Frame memories are normally constructed from one of the families of Synchronous Dynamic Random Access Memory (SDRAM), often referred to simply as DRAM. Existing bit plane memory systems either use slow and obsolete Double Data Rate SDRAM (DDR), or use expensive and limited-availability memory technologies such as Reduced Latency DRAM (RLDRAM), Low Latency DRAM (LLDRAM), Rambus DRAM (RDRAM), or Extreme Data Rate DRAM (XDR-DRAM). More available and less expensive technologies, such as Double Data Rate SDRAM 2 (DDR2) and Double Data Rate SDRAM 3 (DDR3) memories have generally not been used, due to difficulties achieving adequate data bandwidth.

Effective memory speed is determined by the raw speed of the memory devices, as well as the bus utilization of the memory system. In this context, bus utilization means the percent of time that the memory is able to either read or write data.

FIG. 1 shows an example of how 5-bit video can be converted to a simple sequence, comprising 5 bit segments, one bit segment per bit plane. Two video frames are depicted. The Y axis of this graph represents the displayed light intensity, and for binary imaging devices, this light intensity is either on or off, depending on the state of the bit plane data. Note that each bit plane consists of one bit of data for all pixels, so the bit plane data for all pixels must be available to the display, in bit plane order, rather than in conventional pixel order.

More complicated sequences that include many split and repeated bit planes can be designed to improve image quality of the video display, but the fundamental requirement of converting incoming video ordered data to bit planes for every pixel in the video frame remains.

The purposes of a bit plane memory system include:
1. Convert the incoming video stream from video ordered pixel data to bit plane order,
2. Store the bit plane ordered data in memory,
3. Recall bit planes from memory in the order required by the bit sequence, and
4. Send the bit plane data to the display device.

Figure 2:
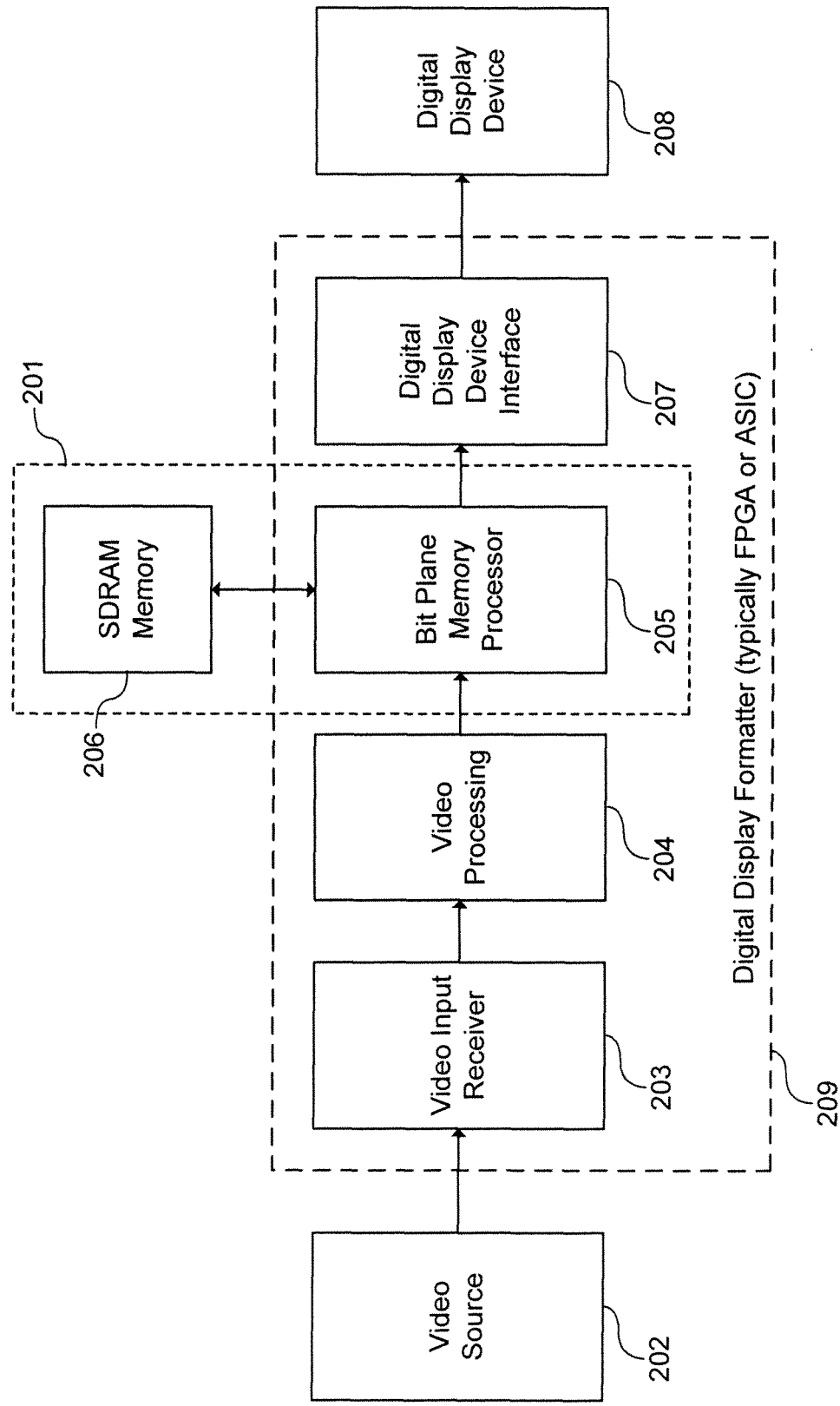
FIG. 2 is a block diagram of a digital display system.

FIG. 2 shows an exemplary location of bit plane memory system 201 within a typical display system based on a digital imaging device. Video input receiver 203, video processing 204, bit plane memory processor 205, and display device interface 207 can be implemented using a Field Programmable Gate Array (FPGA), an Application-Specific Integrated Circuit (ASIC) 209, discrete devices or in other suitable manners. SDRAM 206 as it is used for the bit plane memory system can be located outside of the FPGA, ASIC, discrete devices or other components, but could be located internally.

Given the structure of incoming video and the definition of a bit plane, the bit plane memory system typically must be large enough to store at least two entire frames of video. One frame of storage is used to store incoming image data while the other frame is used to read out stored video bit planes to feed the digital imaging device.

For optimal video display system performance, the bit plane memory system can be fast enough to handle high speed video inputs at the same time that it delivers bit planes to the display device as fast as the display device can accept the bit plane data. The input video can be converted to bit plane format, written to the memory, and then later read from the memory as bit planes. In bit plane memory applications, the memory can be continuously switching between writing new video data into memory and reading bit planes from memory.

While many different types of memory could be used for a bit plane memory system, the large size and high speed requirements can be met by Double Data Rate 3 (DDR3) SDRAM. DDR3 SDRAM can be used because it has large storage capacity, low cost, high speed, and is readily available, due to the use of DDR3 SDRAM in many consumer and commercial products. However, using DDR3 SDRAM does require special care to construct a memory system structure and control scheme to avoid excessive overhead that degrades effective memory speed (i.e. memory bus utilization).

Effective memory speed is determined by the raw speed of the memory devices, as well as the bus utilization of the memory system. In this context, bus utilization can mean the percent of time that the memory is able to either read or write data. In prior bit plane memory applications, conventional DDR3 SDRAM systems suffered from operational overhead that reduces the attainable bus utilization, typically to less than 50%. This low efficiency is mainly due to the cost (in time) of the DDR3's mode switching between read and write, addressing, refresh, and other non-data operations.

One purpose of the bit plane memory system is to convert streaming video-ordered pixel data into bit planes that are the width and height of the video frame. If the input video is X pixels wide and Y pixels high with N bits per pixel, then each input frame of video consists of X by Y by N bits. After conversion to bit planes, there will be N bit planes that are X by Y by 1 bit. The bit plane memory can support simultaneously writing video ordered pixel data and reading bit plane data, as both the video input and the bit plane output are expected to run concurrently. A bit plane memory system could also alternate between writing and reading on a bit-by-bit or a pixel-by-pixel basis, or in other suitable manners.

Figure 3:
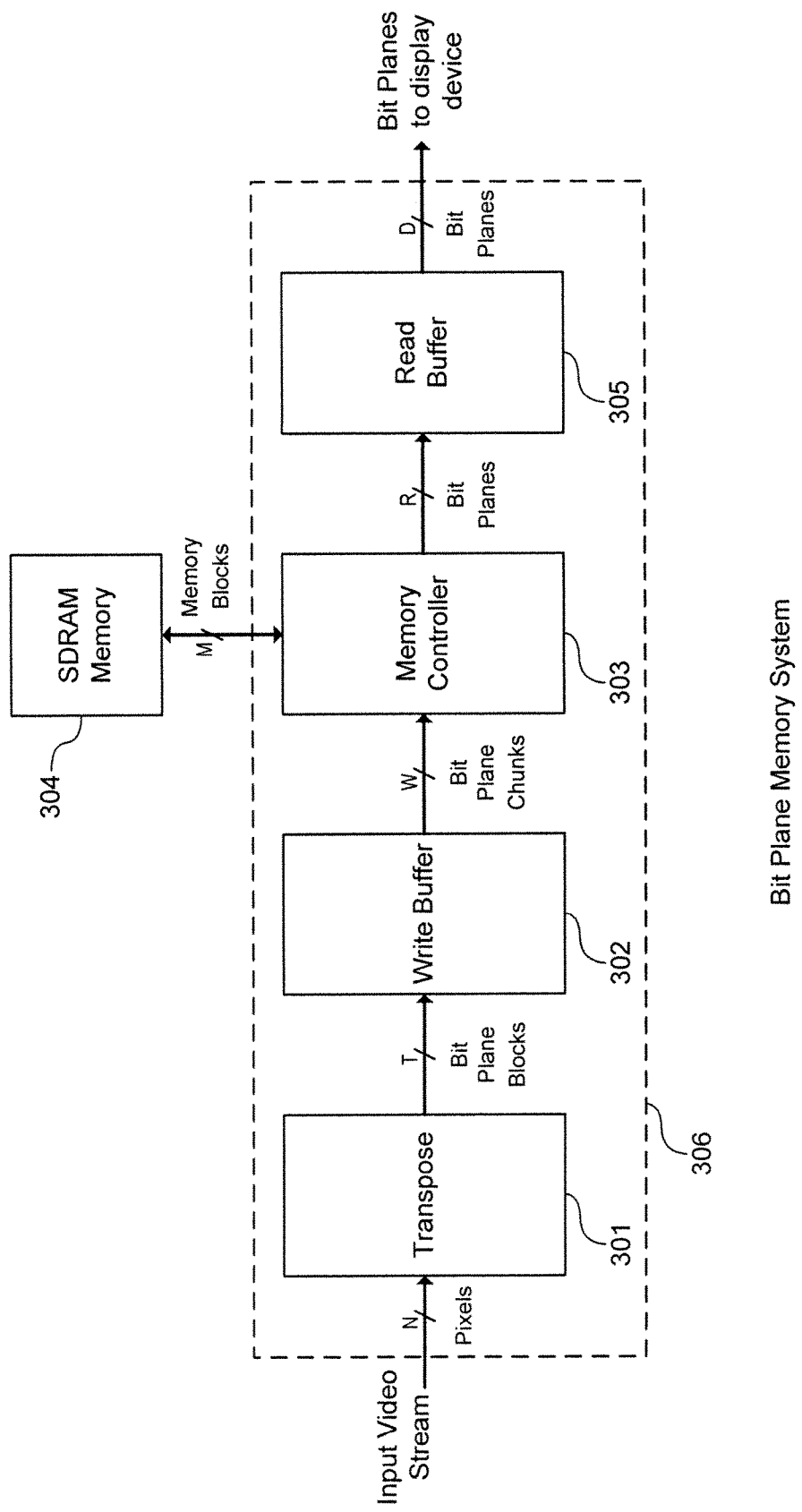
FIG. 3 is a block diagram of a bit plane memory system.

If conversion from pixels to bit planes cannot efficiently take place in one step, such as due to speed limitations of the memory, a cascade approach can be used. FIG. 3 is a block diagram of a bit plane memory system that efficiently fulfills the requirements of a bit plane memory. FIG. 3 shows a generic (non-specific) block diagram of the cascade approach, which comprises of one or more of each of the following elements: transpose 301, write buffer 302, memory controller 303, memory 304, and read buffer 305. At each stage, the data is transformed to become more like the desired data format (i.e. bit plane ordered pixel data). Note that each of these elements can be replicated to provide processing of more than one pixel per clock, if required. The bit plane memory processor 201 of FIG. 2 can correspond to box 306 in FIG. 3.

Referring to FIG. 3, the first stage is transpose 301. It performs a matrix transpose on successive blocks of video ordered pixels, converting them to bit plane blocks. A bit plane block may also be referred to as a block. Each input pixel is N bits wide, with a new pixel arriving every clock cycle. Transpose 301 processes T pixels at a time. Every clock cycle, transpose 301 produces an output bit plane block T pixels wide that contains the same bit plane for each pixel. Thus, transpose 301 converts from N bits of one pixel per clock to T pixels of one bit per clock. Typically, N is equal to T and is relatively small, for example 32 or 128 pixels. Note that multiple transpose units may be used to process more than one pixel per clock cycle.

The second stage is a write buffer 302, which gathers the bit plane blocks from transpose(s) 301 into larger blocks of bit plane data, called bit plane chunks, of width W. Bit plane chunks are wider than T, typically an integer multiple of T, such as 512. A bit plane chunk may also be referred to as a chunk.

The third stage is memory controller 303, which gathers the bit plane chunks into full frame-size bit planes in memory 304, using a scatter-write, linear-read approach. After this point, the data in memory 304 comprises contiguous full frame-size bit planes, one after another, ready to be read-out linearly by memory controller 303. Note that a linear-write, scatter read could be used, with similar results.

The fourth stage is read buffer 305, which provides data continuously to the digital display device, even when memory controller 303 is temporarily busy and cannot provide data to the read buffer. This can occur during memory write operations, as well as for required memory overhead operations, such as refresh and calibration, or in other suitable manners. Read buffer 305 can also be used to convert from the bus width R of memory controller 303 to the bus width D of the digital display device.

To minimize memory and other resource use, a unified memory structure can be used for the SDRAM, instead of a double buffered structure. This requires memory controller 303 to arbitrate memory access between writes, reads, and memory maintenance operations such as refresh and calibration. The arbitration scheme, along with the elasticity of a large read buffer and an appropriately sized write buffer, allows the system to simultaneously ingest a high speed video stream and continuously supply bit planes of data to the digital display device at maximum speed.

Transpose Detail

Figure 4:
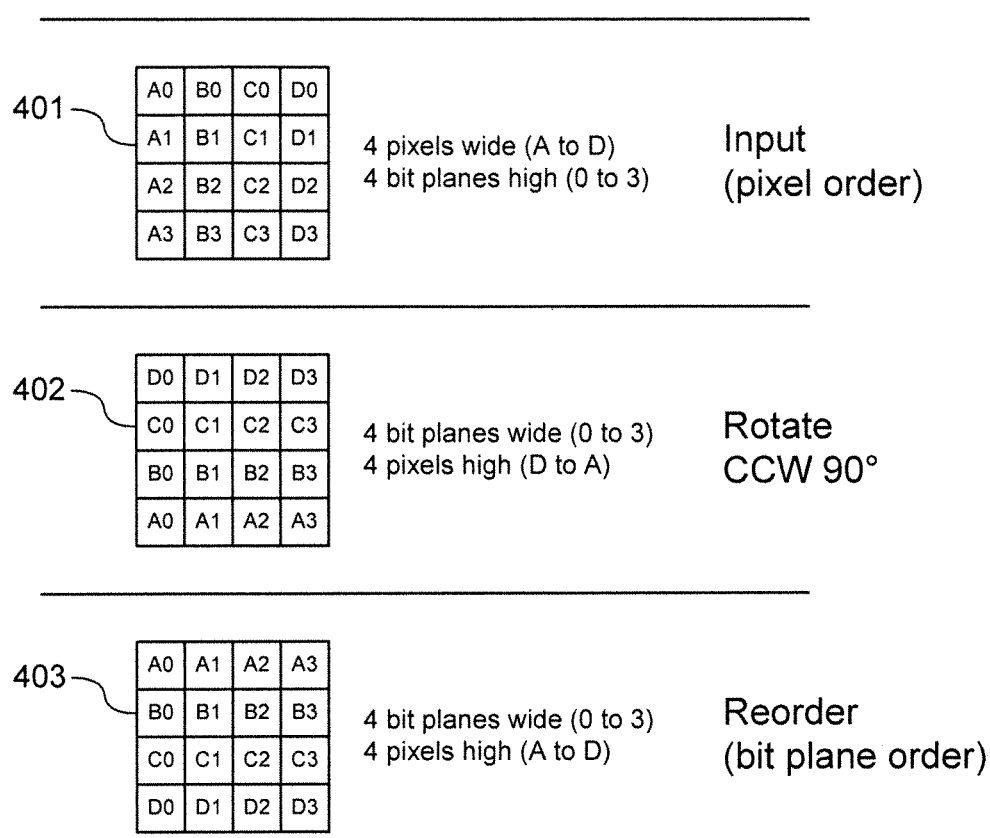
FIG. 4 shows an example transpose operation for 4-bit data.

One method to generate the transpose of a block of data is to first rotate the block of data by 90 degrees. Then the transposed data is obtained by reordering the rotated data. Note that reordering does not consume any circuit resources. FIG. 4 shows an example transpose operation for 4-bit data. Referring to FIG. 4, input data block 401 is four pixels wide by 4 bit planes high. After rotating 90 degrees counterclockwise, rotated data 402 is 4 bit planes wide by 4 pixels high, but the pixel order is reversed. Reordering the data gives output data block 403.

Figure 5:
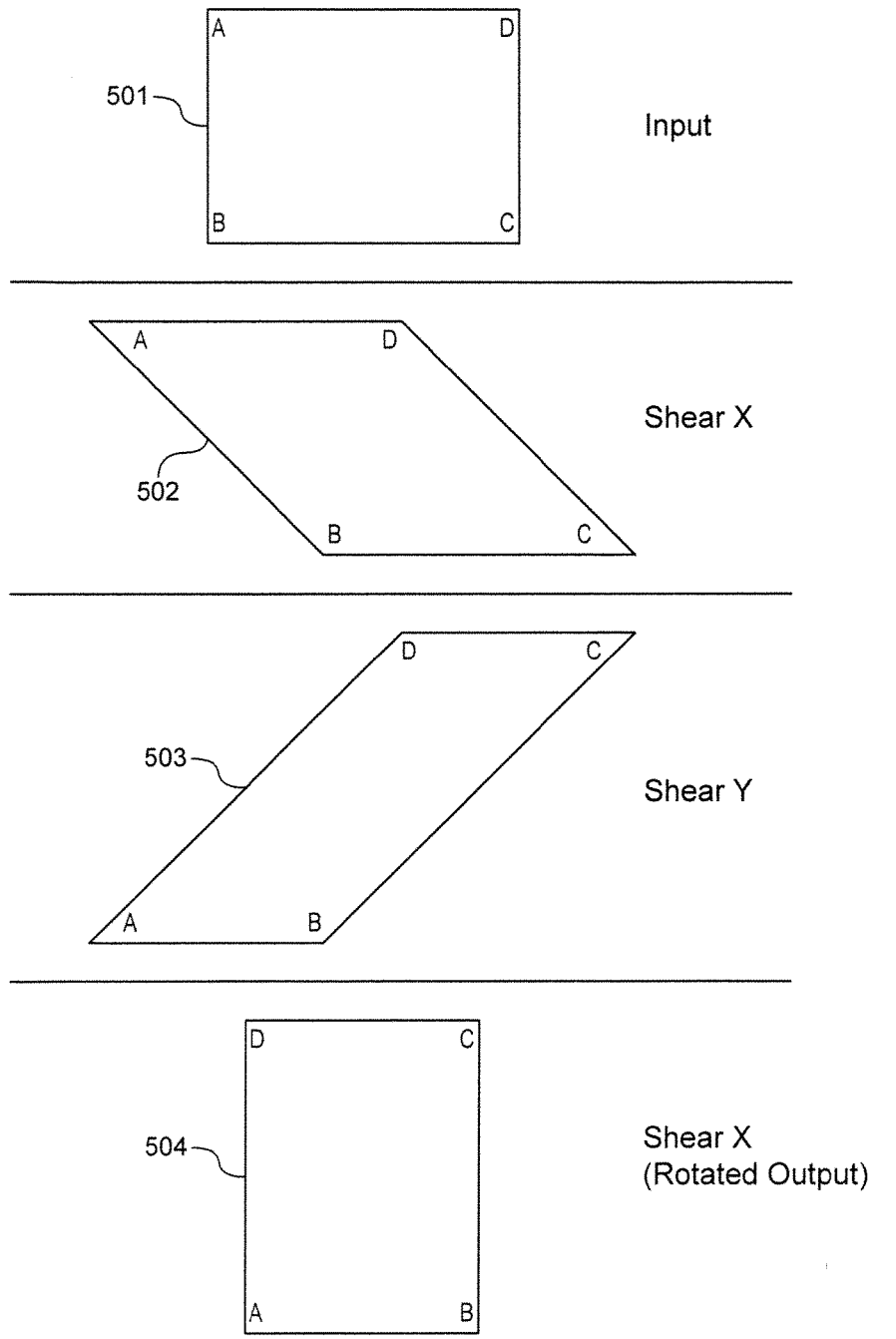
FIG. 5 shows rotation of a generic rectangular block by three shear operations.

One method to rotate a block of data is to perform three successive shear operations (see Paeth, A. W. (1986) "A Fast Algorithm for General Raster Rotation," *Proceedings, Graphics Interface* '86, Canadian Information Processing Society, Vancouver, pp 77-81). FIG. 5 shows rotation of a generic rectangular block by three shear operations. Referring to FIG. 5, input block 501 has corners labeled A, B, C, and D. A first shearing in the X (horizontal) direction results in block 502. A second shearing in the Y (vertical) direction produces block 503. A third shearing in the X (horizontal) direction produces block 504, which is the input block 501 rotated counterclockwise by 90 degrees.

Figure 6:
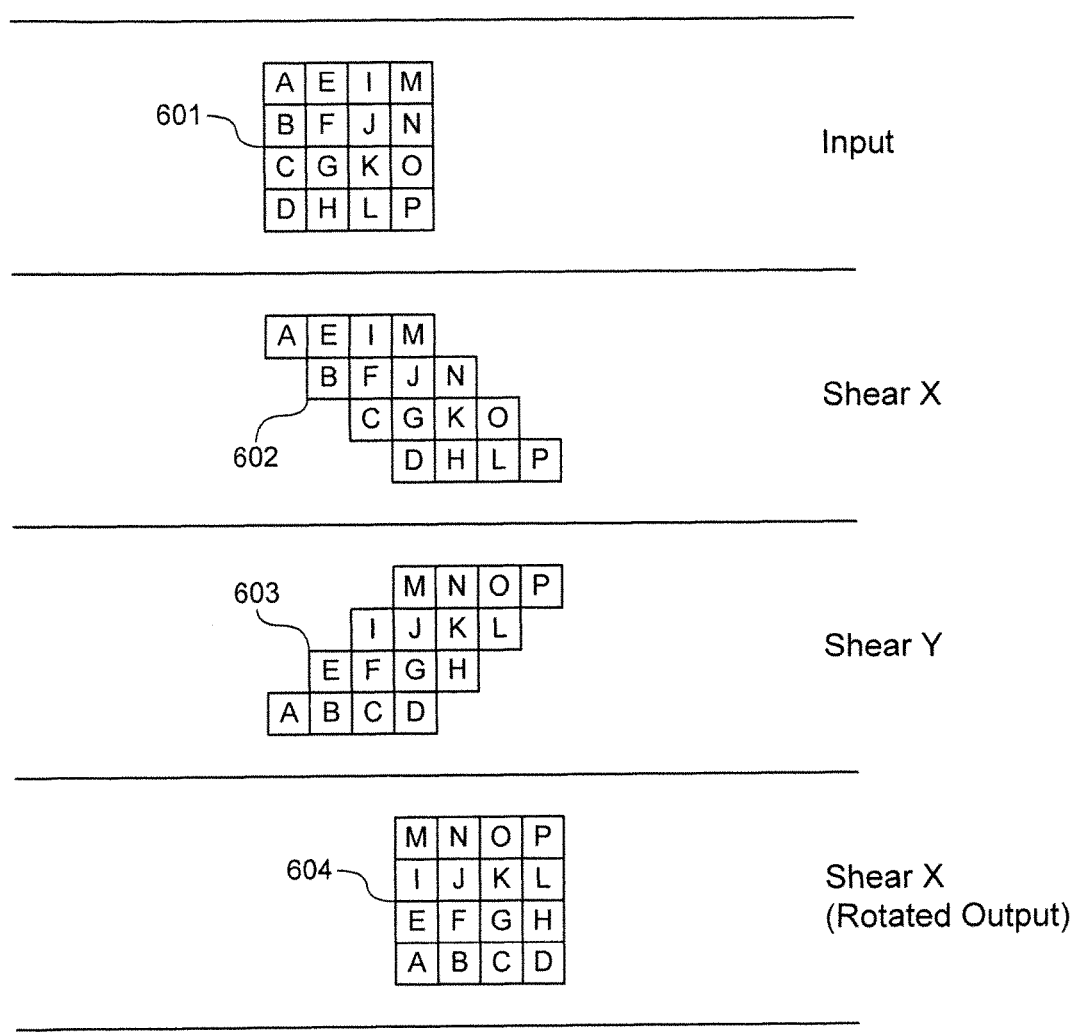
FIG. 6 shows rotation of a block of data by three shear operations.

FIG. 6 shows rotation of a block of data by three shear operations. Referring to FIG. 6, input block 601 has corners labeled A, D, P, and M. A first shearing in the X (horizontal) direction results in block 602. A second shearing in the Y (vertical) direction produces block 603. A third shearing in the X (horizontal) direction produces block 604, which is the input block 601 rotated counterclockwise by 90 degrees.

Figure 7:
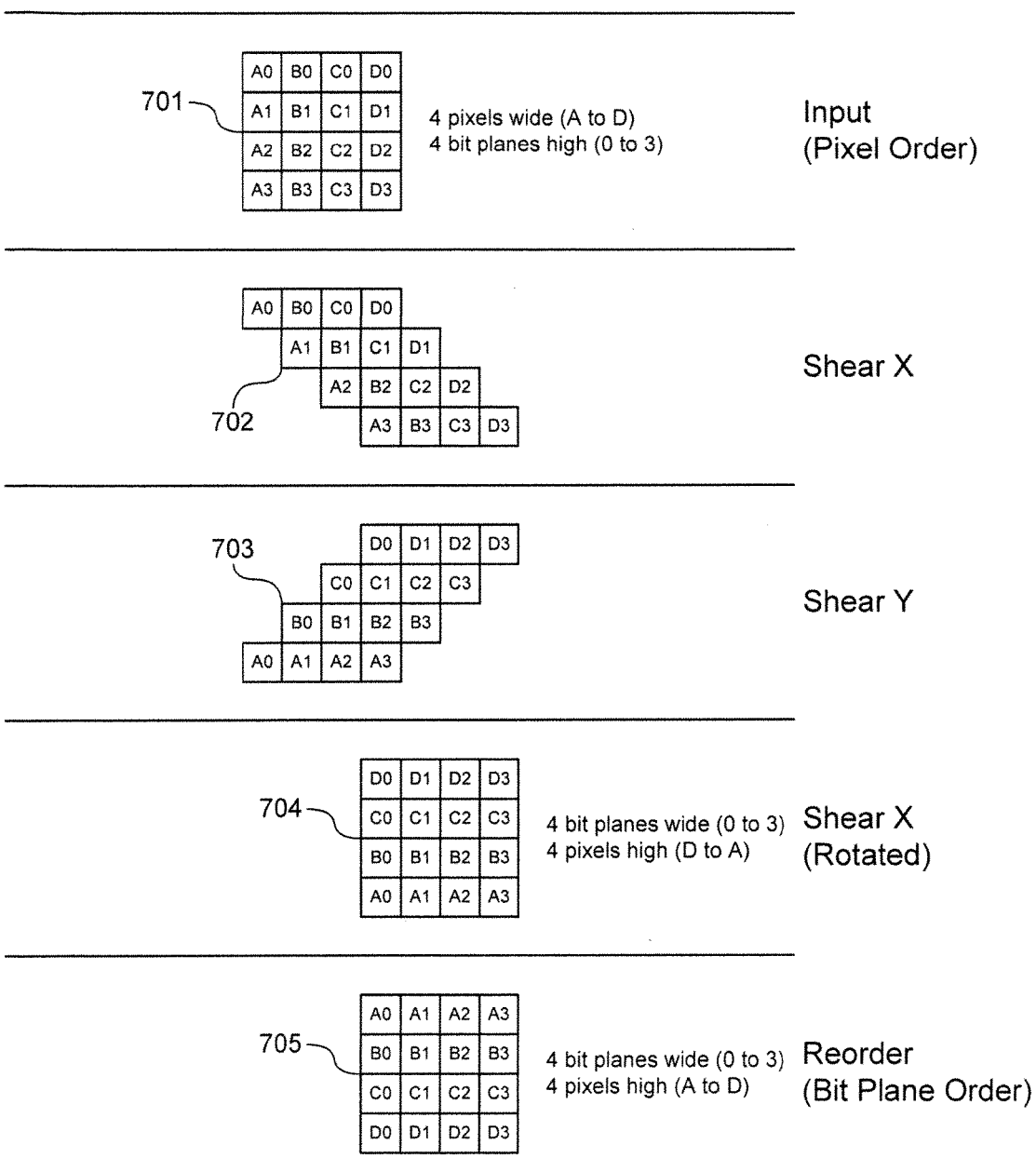
FIG. 7 shows an example transpose of a square block of pixel data, implemented by using only shear operations and data reordering.

FIG. 7 shows an example transpose of a square block of pixel data, implemented by using only shear operations and data reordering. Referring to FIG. 7, input block 701 is 4 pixels wide and 4 bit planes high. The labeling of each bit is of the form 'Pixel BitPlane', e.g. B2 is pixel B and bit plane 2. A first shearing in the X (horizontal) direction produces block 702. A second shearing in the Y (vertical) direction produces block 703. A third shearing in the X (horizontal) direction produces block 704, which is input block 701 rotated counterclockwise by 90 degrees. Reordering the bits produces block 705, which is the transpose of input block 701. Note that reordering data does not increase circuit resource usage.

Figure 8:
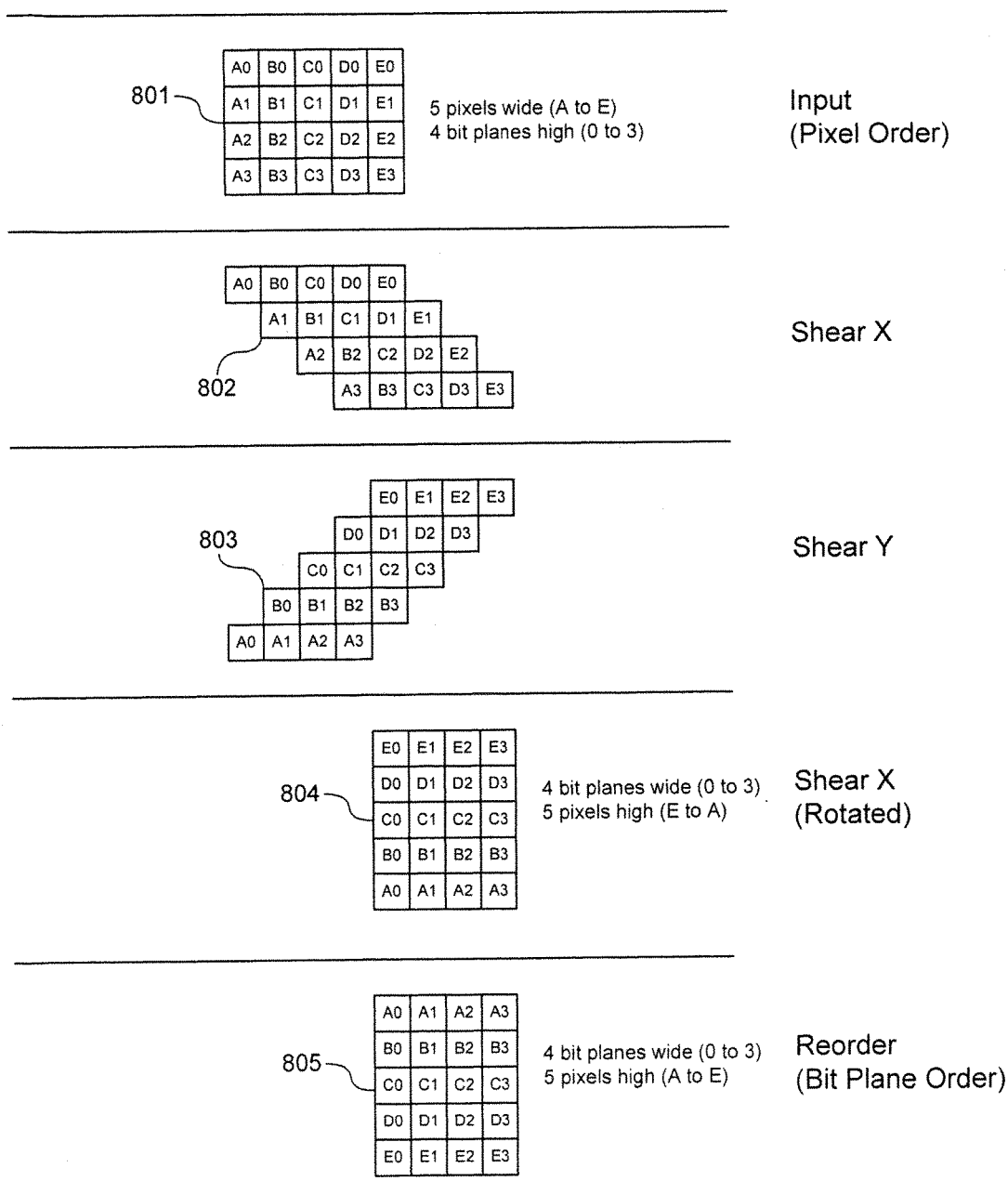
FIG. 8 shows an example transpose of a non-square block of pixel data, implemented by using only shear operations and data reordering.

FIG. 8 shows an example transpose of a non-square block of pixel data, implemented by using only shear operations and data reordering. Referring to FIG. 8, input block 801 is 5 pixels wide and 4 bit planes high. The labeling of each bit is of the form 'Pixel BitPlane', e.g. B2 is pixel B and bit plane 2. A first shearing in the X (horizontal) direction produces block 802. A second shearing in the Y (vertical) direction produces block 803. A third shearing in the X (horizontal) direction produces block 804, which is input block 801 rotated counterclockwise by 90 degrees. Reordering the bits produces block 805, which is the transpose of input block 801. This demonstrates that this technique works for square and rectangular blocks of data.

An advantage of using only shear operations is that they can be implemented in digital logic using only shift registers (i.e. delay lines) for X shear and barrel shifters for Y shear. Prior art methods require expensive multi-port memories (refer to U.S Patent No.) and/or multiple sets of memories to perform the transpose operation (refer to U.S. Pat. No. 5,255,100, U.S. Pat. No. 5,663,749 and U.S. Pat. No. 6,118,500).

Figure 9:
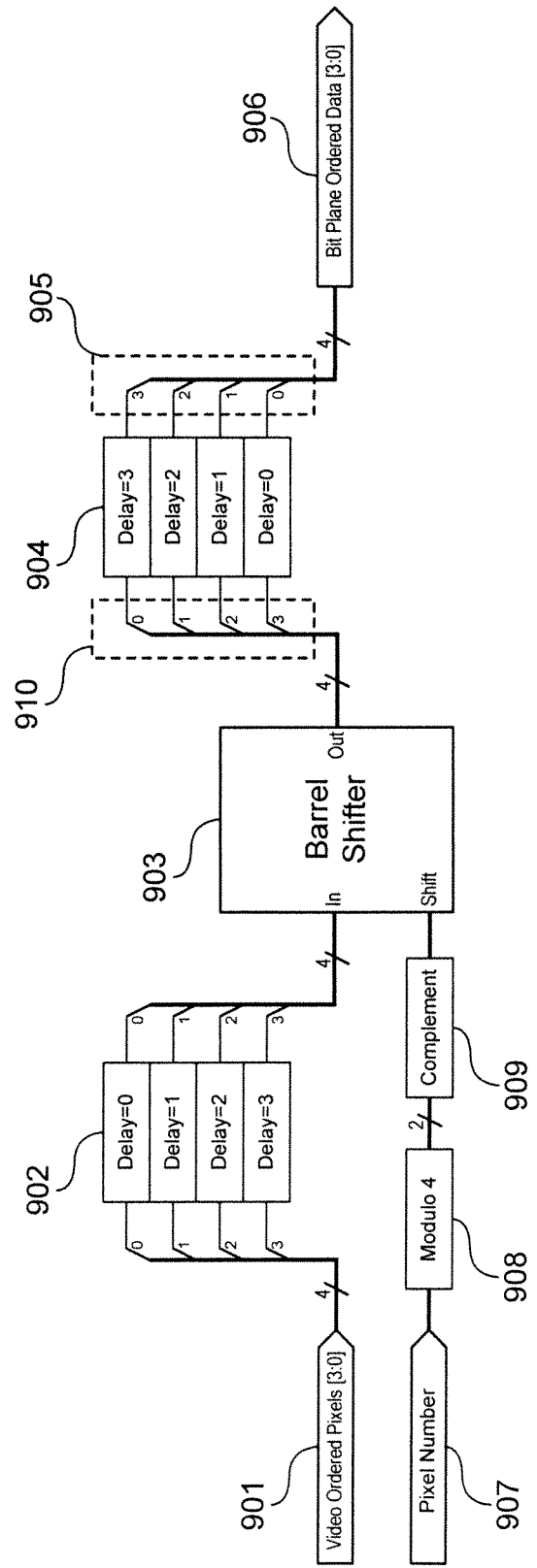
FIG. 9 shows an example transpose embodiment.

FIG. 9 shows an example transpose embodiment. Referring to FIG. 9, input bus 901 provides video-ordered pixel data with 4 bits per pixel. Input delay 902 delays each bit of the pixel data by a different amount, proportional to the number of the bit (e.g. bit 2 of each pixel is delayed by 2 clocks), providing a shear in the X (horizontal) direction. Input Pixel Number 907 provides a pixel number, resetting to zero at the beginning of the frame (or at the beginning of each video line if desired). Modulo unit 908 calculates PN mod T, where PN is the pixel number and T is the transpose output width. For this example T is 4. The output of Modulo Unit 908 counts from zero to three and then repeats. Complement unit 909 inverts the count from Modulo Unit 908. The output of Complement unit 909 counts from three down to zero and then repeats. Barrel shifter 903 rotates the delayed data from input delay 902 by the amount selected by the output of Complement unit 909, providing a shear in the Y (vertical) direction. Note that the complement unit could be eliminated by connecting the barrel shifter output data 910 in reverse bit order. Output delay 904 delays each bit by an amount which cancels the delay of input delay 902, providing a shear in the X (horizontal) direction. The output of Output Delay 904 has been sheared in X, Y, and X and is input bus 901 data rotated by 90 degrees. The data from Output Delay 904 is connected in reverse bit order in box 905, which produces the transpose of the input data 901 at output bus 906. Note that different output width values (T) can be used and typical system may have T of 16 or 18 or 24 or 32, or some other size.

The transpose processing technique as shown in FIG. 9 provides flow-thru operation, meaning that a new block of bit plane ordered data is produced every clock. The transpose can use clocked shift registers or data registers as delay lines for processing. During startup (start of each frame), it takes a number of clock cycles for the data registers to fill and start producing outputs. The number of startup clock cycles is approximately equal to the number of bits per input pixel. The transpose data registers are typically kept full between video lines. At the end of the last active video line, the data registers will still contain partially processed pixel data, so the transpose must process the data contained in the data registers, even though no new data is available at the input of the transpose. This is called a flush. A convenient signal to initiate the flush is the leading edge of the video vertical sync signal. Alternately, the transpose could process the data, regardless of sync and the availability of video data, removing the requirement for a flush operation.

FIG. 10 shows a timing diagram of an idealized 4-bit transpose, showing input versus output, neglecting pipeline delays and other practicalities. The pixel data is labelled with an integer plus decimal fraction. The integer part represents the pixel number of the data and the decimal fraction part represents the bit plane number of the data. For example, 1.00 represents pixel 1 bit plane 0 data and 5.3 represents pixel 5 bit plane 3 data.

Due to limitations in the speed of processing of FPGAs or ASICs and the need to support very high video frame rates, more than one transpose module can be used in parallel, providing the ability to process more than one pixel per clock.

Write Buffer Detail

A write buffer assembles bit plane blocks (of width T) received from one or more transpose units into larger blocks of bit plane data, called bit plane chunks (of width W). The bit plane blocks consist of data from a single bit plane from T pixels. Bit plane chunks are wider than T bits, typically an integer multiple of T, such as 512.

The width W of the bit plane chunks is primarily derived from the size of the smallest block of data that can be written by the memory controller to the SDRAM. This size is determined by the SDRAM bus width and burst mode. For example, a DDR3 SDRAM with an I/O bus width of n bits has a prefetch buffer size of 8n (i.e. eight data words per memory access), results in a burst size of 8 words per memory access. For a DDR3 SDRAM-based memory of width 64 and operated in a burst 8 mode, a block of 512 bits is the smallest block that can be uniquely addressed within the DDR3 SDRAM. In this case, a bit plane chunk width W of 512 would be appropriate, as would integer multiples of 512.

The write buffer is typically also used to cross clock domains from the input pixel clock domain to the memory system clock domain.

Figure 11:
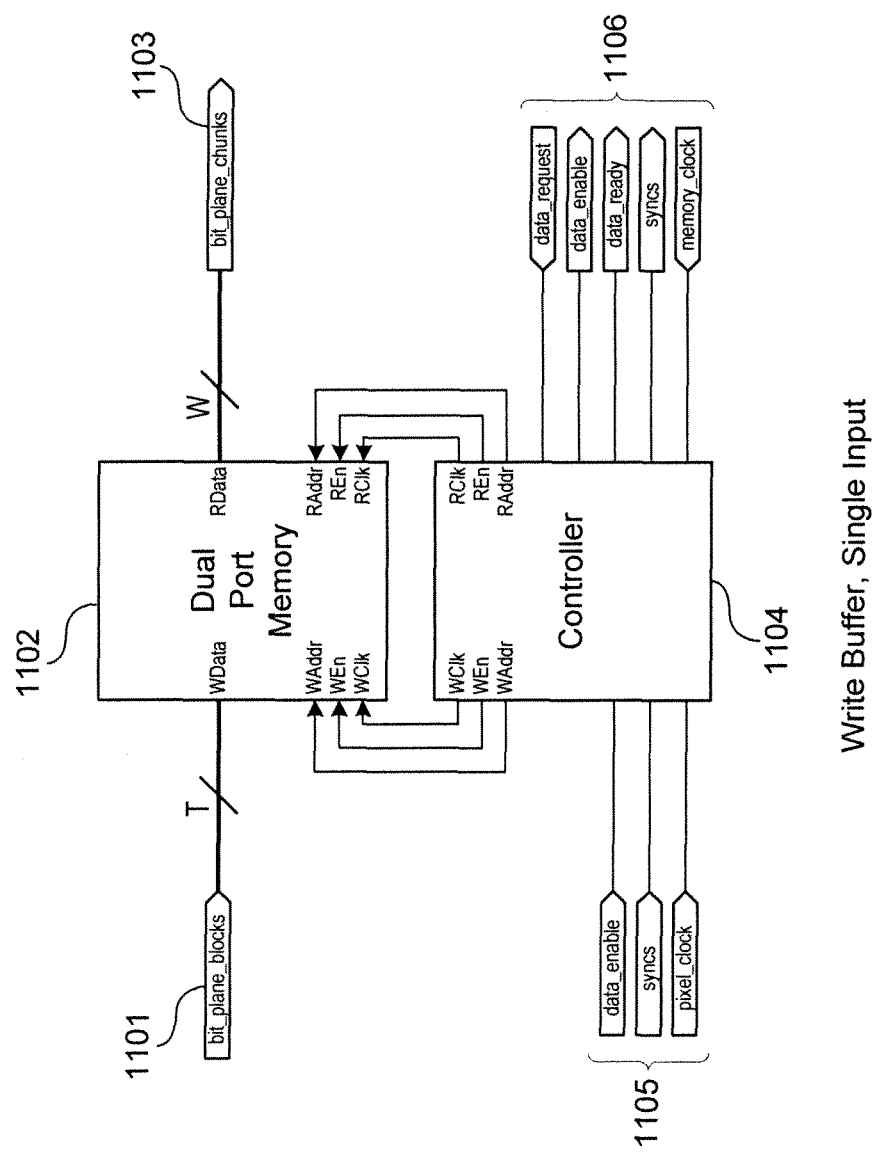
FIG. 11 shows a block diagram of a write buffer with a single data input.

FIG. 11 shows a block diagram of a write buffer with a single data input.

Referring to FIG. 11, bit plane blocks 1101 are the input to dual-port memory 1102. The bit plane block data is T bits wide. Bit plane chunks 1103 are the output from the write buffer. Synchronization signals 1105 and 1106 are used to control the transport of data into and out of the write buffer. Controller 1104 uses the incoming synchronization signals to generate write enable and write address for the write side of dual port memory 1102. Controller 1104 uses synchronization signals to generate read enable and read address for the read side of dual port memory 1102.

Figure 12:
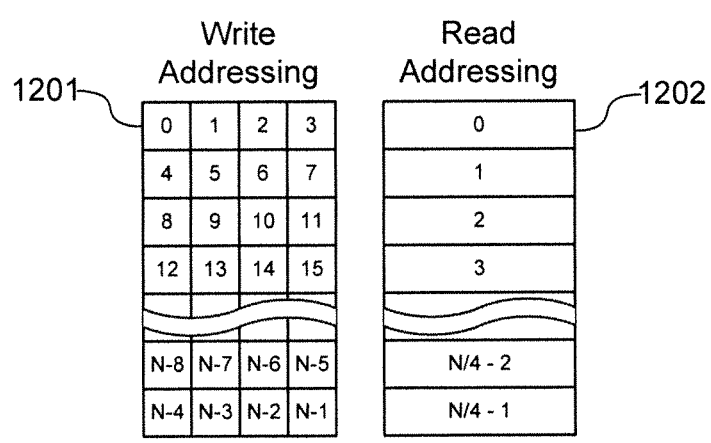
FIG. 12 shows an example dual-port memory address map that has four write addresses for every read address.

Referring again to FIG. 11, one function of the dual-port memory 1102 is to translate from the data width T of the incoming bit plane block data 1101 to the data width W of the outgoing bit plane chunk data 1103. FIG. 12 shows an example dual-port memory address map that has four write addresses for every read address. Referring to FIG. 12, the same memory is represented by write address map 1201 and read address map 1202. For example, data written to write addresses 0, 1, 2, and 3 can be read from read address 0, as the concatenation of the four written data values. This is normal operation for dual-port memories with different data widths on the two ports.

FIG. 13 shows an example address mapping for a write buffer that that inputs bit plane blocks (width T=32 pixels and N=32 bit planes) and outputs bit plane chunks of width W=128. Referring to FIG. 13, the same memory locations are represented by both write address map 1301 and read address map 1302. Bit plane blocks are written 32 pixels at a time and bit plane chunks are read 128 pixels at a time. Each write or read has data for a single bit plane. For writing, bit plane 0 pixels 0-31 are written to write address 0. Bit plane 1 pixels 32-63 are written to write address 5, and so on. For reading, bit plane 0 pixels 0-127 are read from read address 0. Bit plane 22 pixels 0-127 are read from read address 22.

Figure 14:
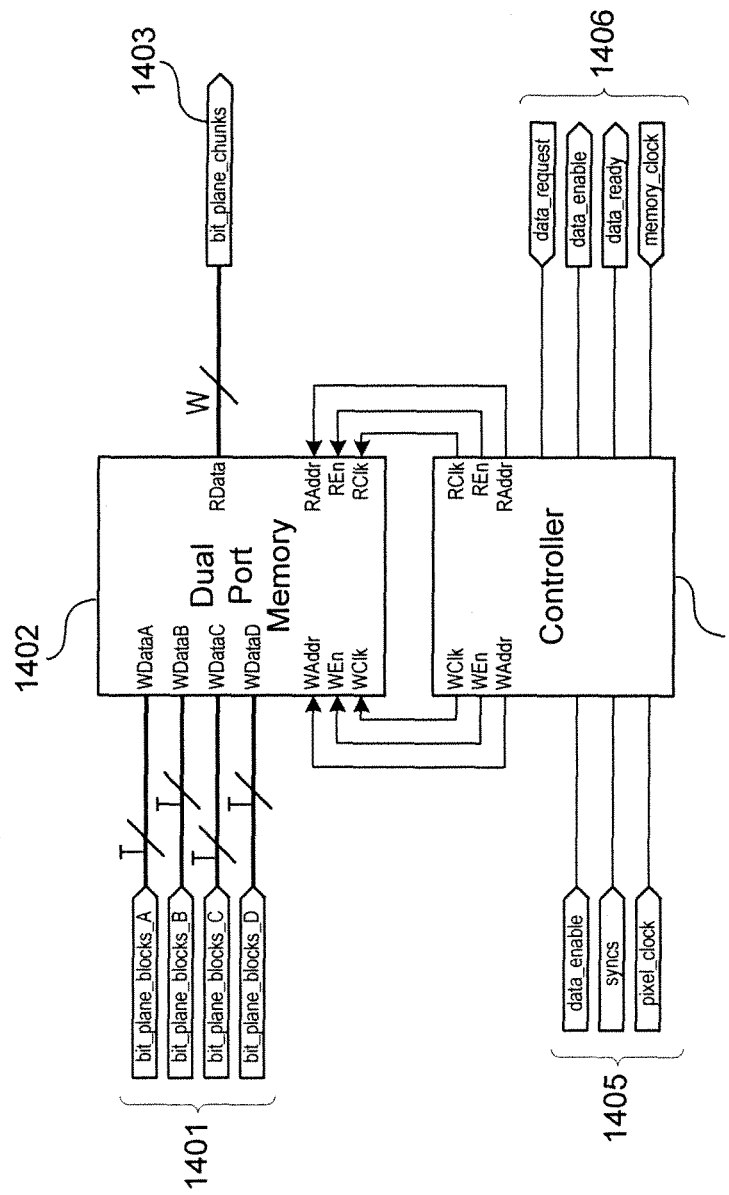
FIG. 14 shows a block diagram of a write buffer with four data inputs.

FIG. 14 shows a block diagram of a write buffer with four data inputs. Referring to FIG. 14, bit plane blocks 1401 are the inputs to dual-port memory 1402. Each bit plane block is T bits wide, giving a total of 4T input bits. The concatenation of the four inputs 1401 is written to the dual-port memory. Bit plane chunks 1403 are the output from the write buffer. Synchronization signals 1405 and 1406 are used to control the transport of data into and out of the write buffer. Controller 1404 uses the incoming synchronization signals 1405 to generate write_enable and write_address signals for the write side of dual port memory 1402. Controller 1404 uses synchronization signals 1406 to generate read_enable and read_address for the read side of dual port memory 1402.

Typically, the memory locations in the dual-port memory are logically divided into two buffers, each half the size of the total memory. These buffers are used in a ping-pong fashion, with one being written to and the other being read. The buffers are swapped (write becomes read and vice versa) when incoming data has completely filled the buffer that is being used for writing. At any point in time, one buffer is used for reading and the other is used for writing. After the buffer used for writing is full, the roles of the two buffers are swapped. The write buffer controller (FIG. 11, 1104 or FIG. 14, 1404) generates a data_ready signal that indicated that unread data is available in the buffer that is being used for reads.

Instead of dividing the memory locations into two logical buffers, an alternate write buffer embodiment uses the dual-port memory as a first-in-first-out (FIFO) memory. This configuration has the advantage that less total memory is needed, but control of the memory is more complicated.

It is desirable for the size of each logical buffer to be as small as possible, to minimize the time required to empty the write buffer. Multiple constraints limit how small the buffers can be. At a minimum, each buffer should be large enough to hold N bit plane chunks of width W. Less than this can prevent or hinder the assembly of bit plane chunks for all N bit planes, as the last bit plane block of the first bit plane chunk arrives at the write buffer just after the next to last bit plane chunk of the last bit plane chunk. Referring again to FIG. 13, recall that for this example N=32, T=32, and W=128. Write order 1303 shows the order that the locations in the write buffer are filled. Note that the final block of the bit plane chunk containing bit plane 0 pixels 0-127 are not written into the buffer until the $97^{th}$ clock, at write address 3. Reading of read address 0 cannot begin until after this point. Note that a FIFO structure could use less memory, but would require the ability to predict in advance that enough data is present to begin SDRAM writes.

Referring again to FIG. 3, during maximum bandwidth operation, the memory controller 303 must empty the half of write buffer 302 used for reads in less time than it takes the data from transpose 301 to fill the half of the write buffer 302 used for writes to prevent buffer overflow. Bit plane block data is streamed into write buffer 302 (i.e. cannot be throttled or interrupted) and write buffer 302 can respond immediately. Data is burst out of write buffer 302 at a high rate when memory controller 303 is ready to accept it. Since the width of write buffer 302 output W is normally larger than the width of write buffer 302 input T, emptying the buffer happens faster than filling, subject to the write and read clock speeds. Another constraint on the minimum logical buffer size for write buffer 302 is that low level SDRAM activities, such as refresh and periodic read calibration, can preempt reading from write buffer 302 from emptying. This can result in write buffer overflow and must be avoided. Increasing the size of the logical buffers, usually by an integer factor (i.e. 2) gives extra time for interruptions from low level operations.

Memory Controller Detail

Referring again to FIG. 3, memory controller 303, in conjunction with the SDRAM 304, performs the third stage of the cascade operation. Using a scatter writing and reading scheme, memory controller 303 scatter-writes bit plane chunks of width W from write buffer 302 to SDRAM 304 in chunk order, such that reading from SDRAM 304 in bit plane order results in contiguous full frame bit planes of data. Memory controller 303 accepts bit plane chunks of size W from write buffer 302 and delivers full video frame size bit plane data to the display device or display device interface, via the read buffer. Memory controller 303 performs this block reordering function by manipulating SDRAM write and read addresses appropriately.

Figure 17:
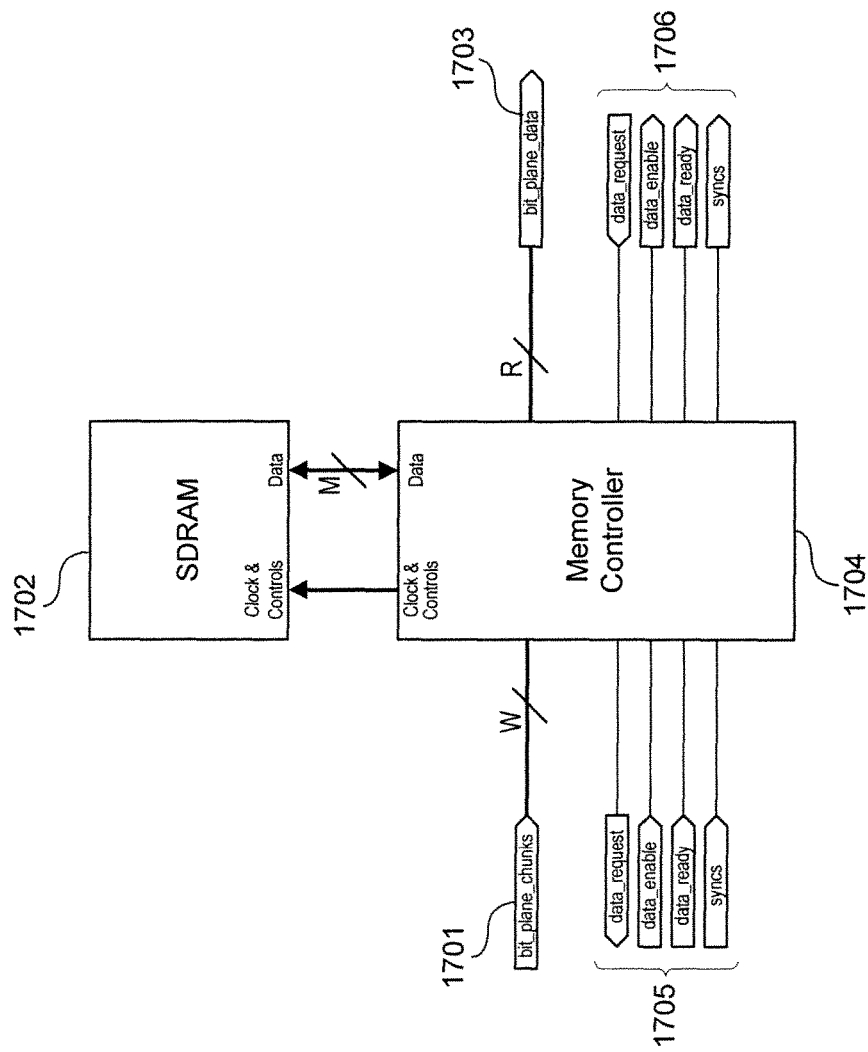
FIG. 17 shows a block diagram of a memory controller and associated SDRAM.

FIG. 17 shows a block diagram of a memory controller and associated SDRAM. Referring to FIG. 17, bit plane chunk data 1701 are the input to memory controller 1704. The bit plane chunk data is W bits wide. Bit plane ordered data 1703 of width R is output to the read buffer. Synchronization signals 1105 and 1106 are used to control the transport of data into and out of memory controller 1704. Memory controller 1704 transfers data to or from SDRAM 1702, as well as performing periodic refresh and other low level maintenance operations.

Referring again to FIG. 17, one function of memory controller 1704 is to translate from the data width W of the incoming bit plane chunk data 1701 to the data width M of the SDRAM 1702. Another function of memory controller 1704 is to translate from the data width M of SDRAM 1702 to the data width R of the outgoing bit plane ordered data 1703.

Memory overhead can be minimized for highest possible system performance, but care must be taken in how bit planes are mapped in to the SDRAM address space. The memory map can be defined in such a way that both write and read access to the SDRAM can occur without interruption when SDRAM bank or row changes are required.

SDRAM are typically addressed using three types of address signals, each in the form of a binary number. Row address signals select a row of internal memory, which is the fundamental internal data block of SDRAM, i.e. changing the row address requires accessing the internal memory, which is a relatively slow operation. Column address signals select a portion of a row. Column addresses can be changed much more quickly than row addresses, usually changing for every burst of data to or from the SDRAM. Bank address signals select between multiple memory subsystems in the SDRAM device, where theses subsystems can operate mostly in parallel. Bank addresses can also change for every burst of data to or from the SDRAM. Common DDR3 SDRAM typically has 10 column address signals, 3 bank address signals, and enough row address signals such that all of the memory can be addressed.

Figure 18:
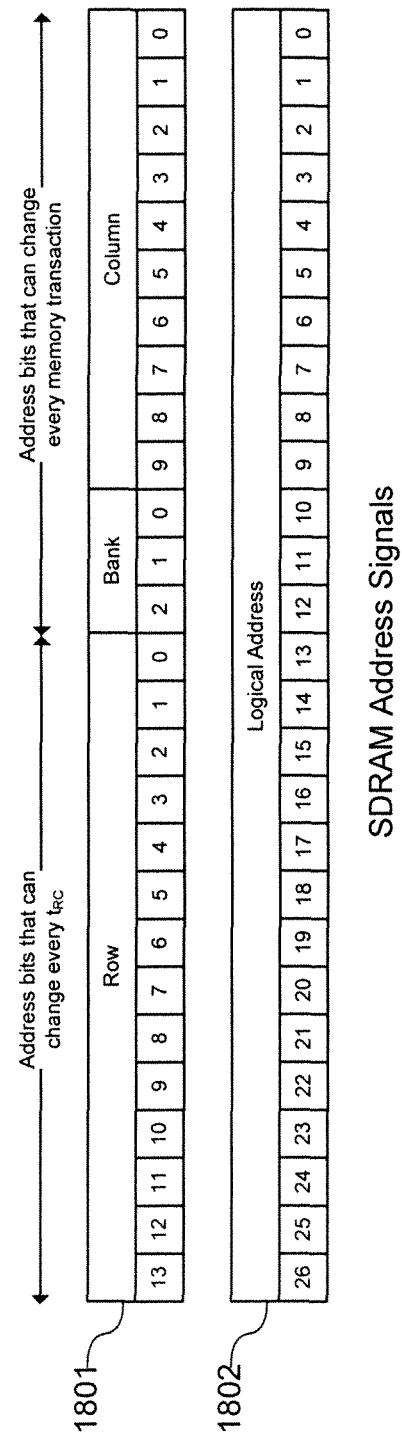
FIG. 18 represents two logical views of the address signals for a SDRAM device.

FIG. 18 represents two logical views of the address signals for an SDRAM device. Referring to FIG. 18, separate row, bank, and column address signals 1801 are depicted concatenated with row in the most significant bits, bank in the middle bits, and column in the least significant bits. Other orderings are possible, but this is a common ordering used with SDRAM devices. Logical address signals 1802 are shown to indicate that address signals 1801 are mapped to the equivalent logical address signals 1802, with no loss of generality. Note that, depending of the minimum burst length of a SDRAM device, one or more of the least significant column address bits may be set to a constant value (usually zero), for maximum transfer speed. For example, if the minimum burst length is 8, the least significant column address bits may be either unused or set to a constant value. For bit plane memory applications, typically all transfers are a full SDRAM burst, to achieve maximum speed and efficiency. For unusual size transfers, the least significant column address bits can be used, but at the cost of reduced speed and efficiency.

Since SDRAM row address signals require the longest delay between changes, the other address signals (bank and column) can be used to separate row address changes by as much time as required by the SDRAM device, in order to achieve maximum efficiency. This separation can be accomplished by mapping the bit plane chunk data to the SDRAM address space in a particular way, as will be described below. Note that there are several ways to accomplish this mapping that meet the requirement of separating row address changes by sufficient time for the SDRAM device.

There are ChunksPerFrame bit plane chunks in each bit plane of an image frame, where ChunksPerFrame=W/(Pixels per Frame). Bit plane chunks are numbered from 0 to (ChunksPerFrame−1). For example, a 4096 by 2160 image has 8,847,360 pixels. If W is 512, then there are 17,280 bit plane chunks per frame per bit plane. These bit plane chunks are numbered 0 to 17,269. Bit planes are numbered from 0 to N−1.

The bit plane number and bit plane chunk number are both represented in binary form. Binary numbers are made up of binary bits. Each binary bit can be either 0 or 1. Each binary bit represents a power of 2, with more significant bits representing higher powers of two. It is customary for the bits in a binary number to be represented in increasing power of 2 and significance from right to left. Thus, bits to the left are higher in significance than bits to the right. A well-known property of binary numbers is that when a binary number counts either up or down, the least significant bits change first and fastest. This means that while counting, before a given bit in a binary number changes, all the bits of lesser significance will have counted through all possible combinations of binary values of the bits of lesser significance.

During writes to the SDRAM, bit plane chunks containing W pixels of a single bit plane are written to the SDRAM. Each successive bit plane chunk contains pixels of a different bit plane. After a bit plane chunk has been written for each bit plane, the next chunk is written for each bit plane, starting at bit plane zero. This means the bit plane number is changing with each write, and the bit plane chunk number changes after N bit plane chunks have been written, where N is the number of bit planes in the data. Thus, during writes, the bit plane number changes the fastest, with the bit plane chunk number changing slower by a factor of N.

During reads from the SDRAM, bit plane chunks, containing R pixels of a single bit plane, are read from the SDRAM. Each successive bit plane chunk is from the same bit plane, until an entire frame of bit plane data has been read. This means that the bit plane chunk number is changing with each read, and the bit plane number changes only after all chunks of that bit plane have been read. Thus, during reads, the bit plane chunk number changes the fastest, with the bit plane number changing slower by a factor of ChunksPerFrame.

Figure 19:
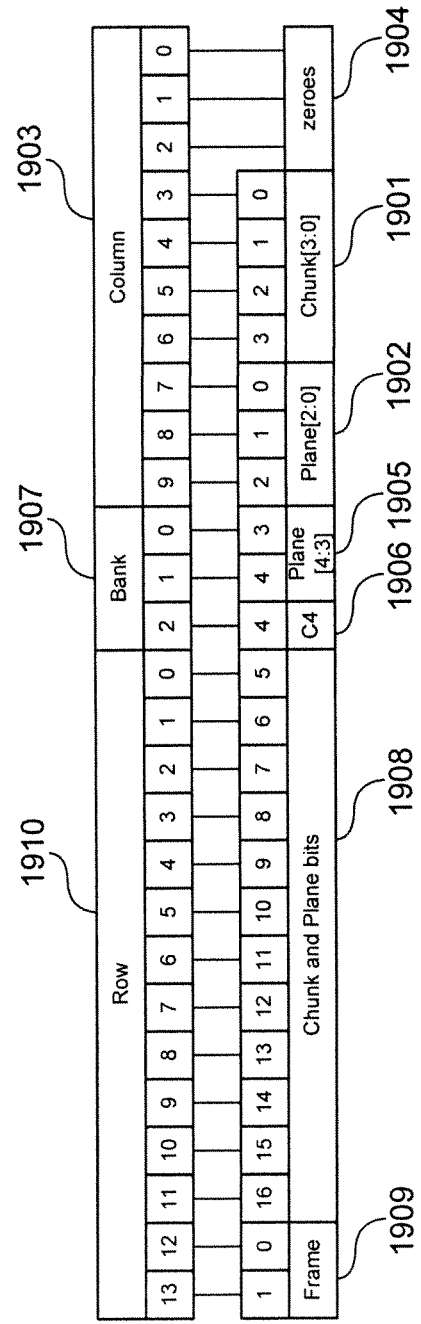
FIG. 19 shows a mapping of plane, chunk, and frame signals to SDRAM address signals, LSBs first.

Bit plane chunk data must be mapped to a SDRAM location that is unique for each bit plane number, each bit plane chunk number, and each image frame. One method for this mapping is to use subsections of the binary numbering of the plane, chunk, and frame to the SDRAM address signals. FIG. 19 shows a mapping of plane, chunk, and frame signals to SDRAM address signals. Referring to FIG. 19, the least significant four bits of the chunk number 1901 and the least three significant bits of the bit plane number 1902 are connected to SDRAM column address signals 1903. The least significant three bits of SDRAM column address signals are driven by constant zeroes 1904. Note that the most significant 7 column address signals 1903 are completely interchangeable with each other, i.e. the order in which the least significant bit plane number 1902 signals and least significant chunk number signals is arbitrary and has not effect on performance. The next most significant two bits of the bit plane number 1905 are connected to two of the SDRAM bank address signals 1907. The next most significant bit of the chunk number signals 1906 is connected to the third SDRAM bank address signal. The remainder of SDRAM address signals are driven by the remaining bit plane number bits, bit plane chunk number bits, and frame number bits. For both bit plane number and chunk number, this meets the requirement that least significant bits are connected to column address signals and that the next most significant bit is connected to a bank signal, resulting in the greatest separation in time between row address changes, as bit plane number and chunk number increment or decrement.

Figure 20:
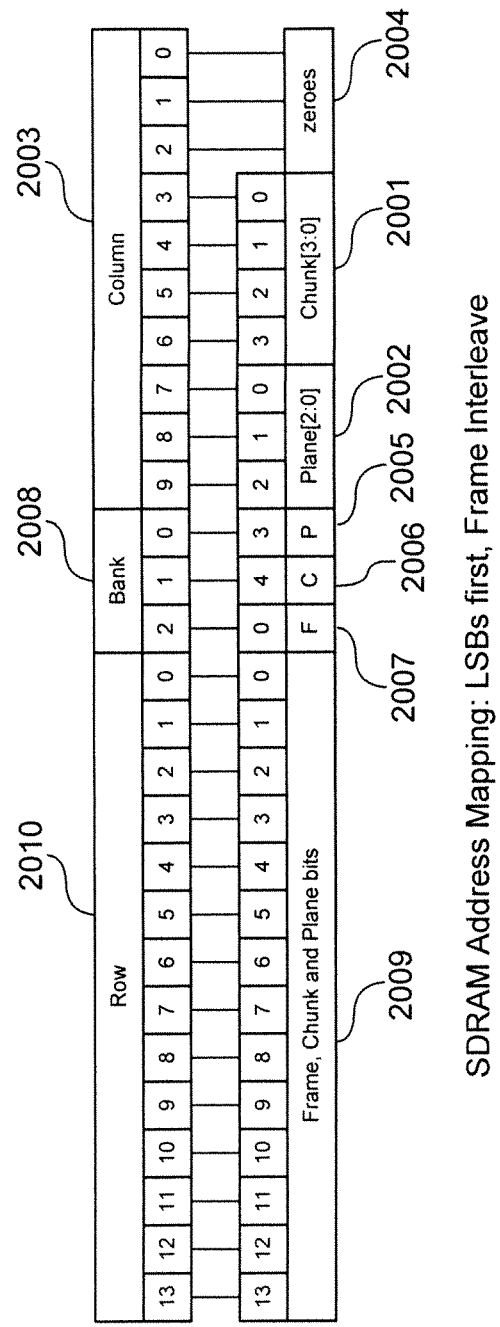
FIG. 20 shows a mapping of plane, chunk, and frame signals to SDRAM address signals with frame interleave.

A second method for mapping bit plane chunk data to SDRAM locations is to again use subsections of the binary numbering of the plane, chunk, and frame to the SDRAM address signals. FIG. 20 shows a mapping of plane, chunk, and frame signals to SDRAM address signals. Referring to FIG. 20, the least significant four bits of the chunk number 2001 and the least three significant bits of the bit plane number 2002 are connected to SDRAM column address signals 2003. The least significant three bits of SDRAM column address signals are driven by constant zeroes 2004. Note again that the most significant 7 column address signals 2003 are completely interchangeable with each other, i.e. the order in which the least significant bit plane number 2002 signals and least significant chunk number signals is arbitrary and has not effect on performance. The next most significant bit of the bit plane number 2005 is connected to a first SDRAM bank address signal 2008. The next most significant bit of the chunk number signals 2006 is connected to a second SDRAM bank address signal. The least significant frame count bit 2007 is connected to a third SDRAM bank address signal. The remainder of SDRAM address signals are driven by the remaining bit plane number bits, bit plane chunk number bits, and frame number bits. For both bit plane number and chunk number, this configuration meets the requirement that least significant bits are connected to column address signals and that the next most significant bit is connected to a bank signal, resulting in the greatest separation in time between row address changes, as bit plane number and chunk number increment or decrement. In addition, the connection of the least significant frame count bit to an SDRAM bank address signal causes reads and writes to use a different subset of the available banks. This configuration provides for zero overhead switching between read and write operations. Since the read and write frame numbers normally differ by one, the least significant bit of the frame count will be different for reads and writes to the SDRAM device.

Figure 21:
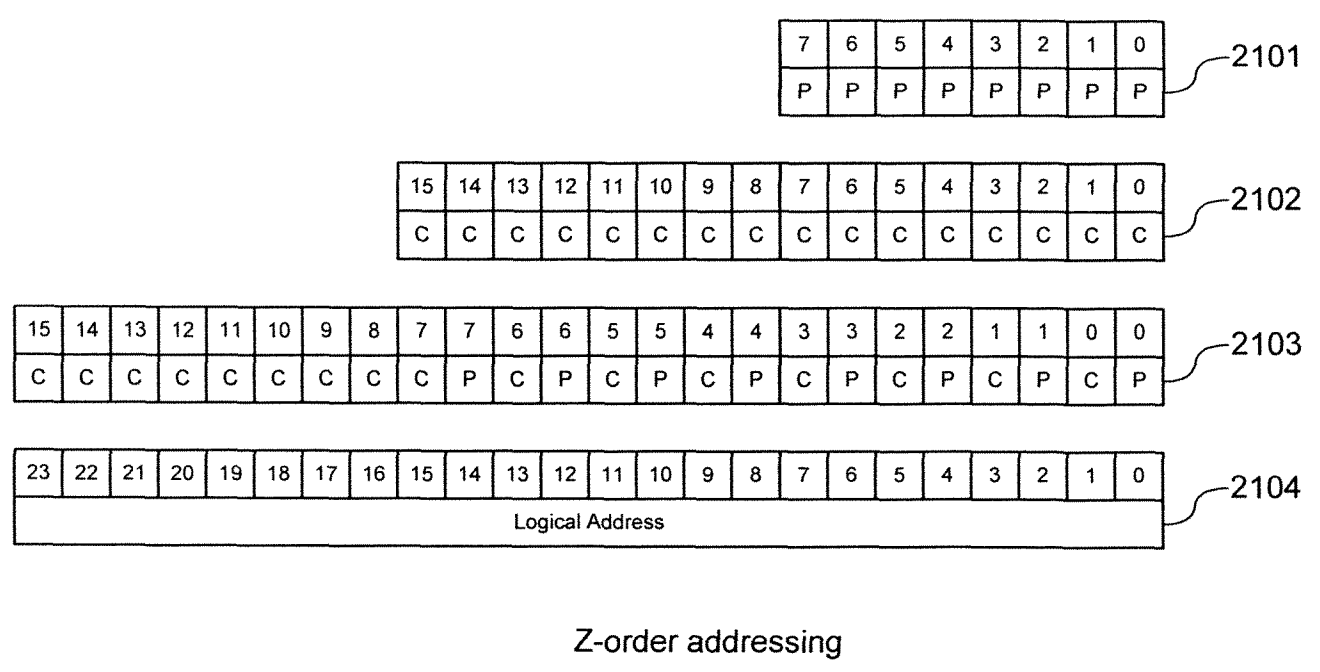

A third method for mapping bit plane chunk data to SDRAM locations is to use Z-ordered, or Morton ordered addressing. Z-order, or Morton order, is a function which maps multi-dimensional data to one dimension while preserving locality of the data points, see "Morton, G. M. (1966), *A computer Oriented Geodetic Data Base; and a New Technique in File Sequencing*, Technical Report, Ottawa, Canada: IBM Ltd." The z-value of a point in multi-dimensions can be calculated by interleaving the binary representations of its coordinate values. In the case of bit plane chunk data, there are two dimensions: the bit plane number and the bit plane chunk number. FIG. 21 shows the transformation from separate plane and chunk numbers to z-order. Referring to FIG. 21, eight bits of bit plane number 2101 and 16 bits of bit plane chunk number 2102 are combined to give Z-order 2103 by interleaving the binary bits of the bit plane number and bit plane chunk number. The bits of the Z-ordered bits correspond to the logical address 2104, which can be used to address SDRAM. The frame number could be considered a third dimension and included in the Z-ordered address, but it changes slowly enough to have little effect on memory efficiency. If zero-overhead switching between read and write operations is required, the least significant bit of the frame count may be connected to an SDRAM bank address signal.

Figure 22:
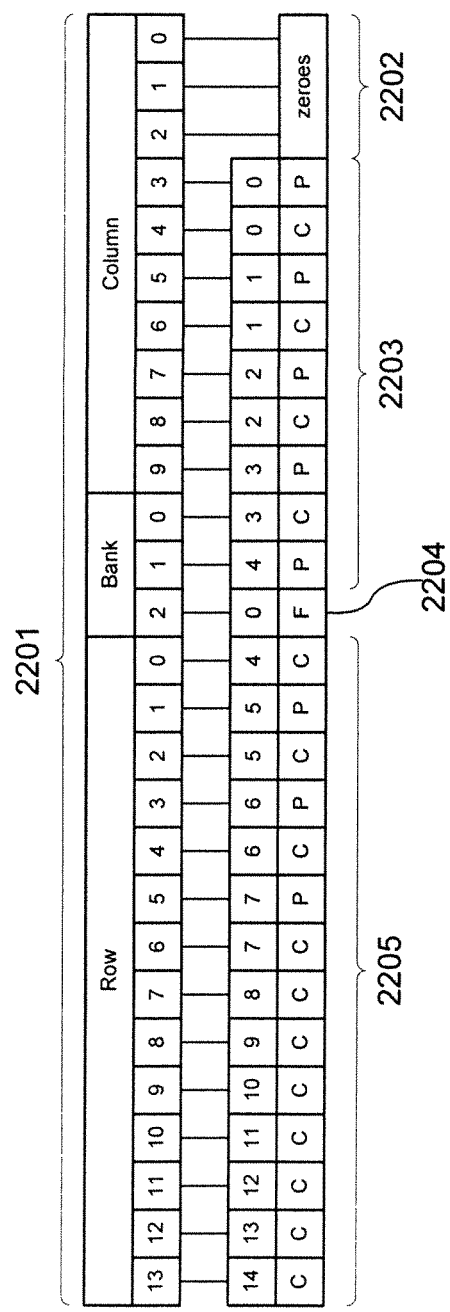
FIG. 22 shows a mapping of Z-ordered shows a mapping of plane, chunk, and frame signals to SDRAM address signals.

FIG. 22 shows a Z-ordered mapping of plane, chunk, and frame signals to SDRAM address signals. Referring to FIG. 22, the SDRAM address signals 2201 are connected to three constant zero bits 2202, the least significant Z-order bits 2203, the least significant frame count bit 2204, and the most significant Z-order bits 2205. Note again that the most significant 7 column address signals 2003 are completely interchangeable with each other. Due to the characteristics of the Z-order (preservation of locality), the separation in time between row address changes is maximized. The connection of the least significant frame count bit to an SDRAM bank address signal causes reads and writes to use a different subset of the available banks. This provides for zero overhead switching between read and write operations. Since the read and write frame numbers normally differ by one, the least significant bit of the frame count will be different for reads and writes to the SDRAM device.

SDRAM write address generation is based on video counters (memory block, line and frame counters) that are advanced by the incoming video syncs. SDRAM read address generation is based on bit plane requests from a display controller and on a read memory block counter that counts memory block reads since a display controller request. The read memory block counter is reset upon a new display controller request. The memory controller includes a display controller request FIFO and can hold up to multiple pending requests. The memory controller read address generator compares the read memory block counter to the calculated memory block stop count (calculated from the display controller request parameters) and asserts a read stop signal when the requested number of read blocks have been transfer to the display device. The memory controller can swap read and write frames in SDRAM based on incoming video vertical syncs.

In addition to reordering bit plane blocks via SDRAM address manipulation, the memory controller must also arbitrate between writes and reads to the SDRAM, as well as SDRAM low-level maintenance operations, such as refresh and periodic read calibration. The memory controller arbiter monitors write buffer and read buffer data ready signals and starts SDRAM writes or reads as required. The memory access priority scheme is defined in Table 1.

TABLE 1

| Priority | Memory Burst Size | Memory Operation |
| --- | --- | --- |
| Highest | Smallest | SDRAM low level functions (refresh, periodic read, etc. |
| Medium | Medium | Bit Plane Data Writes |
| Lowest | Largest | Bit Plane Data Reads |

In general, memory operation priority is in inverse order to the length of time each operation takes. Low level SDRAM maintenance functions are the fastest and the highest priority. Writing bit plane data from the write buffer is the next highest priority. In general, the write buffer is sized as small as possible while still being able to gather transpose blocks into bit plane chunks, but it must also be large enough to buffer the input video stream during low level SDRAM functions. Additional constraints on write transactions include minimum number of writes between switching SDRAM banks and the time required for the SDRAM to switch between writing and reading. Reading bit plane data to the read buffer is the lowest priority and takes the longest time per transaction. The read buffer should be sized large enough to buffer up enough data to deliver a continuous stream of bit plane data to the display device while periodically being interrupted by burst of write data into the SDRAM and low level SDRAM functions. For maximum performance, the read buffer should be large enough such that one read buffer worth of data delivered to the display device spans at least the time interval of one input video line. This allows the input video horizontal blanking time to be used to prevent the read buffer from under-flowing during maximum SDRAM bandwidth operation. The write buffer converts the input video stream into small high frequency bursts of data to be written into the SDRAM.

Read Buffer Detail

A read buffer accepts bit plane ordered data (of width R) received from a memory controller. The read buffer outputs bit plane ordered data (of width D) to a digital display device or a digital display device interface. The bit plane ordered data usually comprises a full frames of single bit planes.

The width R of the bit plane data to the read buffer is primarily derived from the size of the smallest block of data that can be read by the memory controller from the SDRAM. This is generally the same width as W, the output of the write buffer. This size is determined by the SDRAM bus width and burst mode. For example, a DDR3 SDRAM with an I/O bus width of n bits has a prefetch buffer size of 8n (i.e. eight data words per memory access), resulting in a burst size of 8 words per memory access. For a DDR3 SDRAM of width 64 and operated in a burst 8 mode, a block of 512 bits is the smallest block that can be uniquely addressed within a DDR3 SDRAM. In this case, a bit plane data width R of 512 would be appropriate.

The read buffer is typically also used to cross clock domains from the memory system clock domain to the digital display device clock domain.

Figure 15:
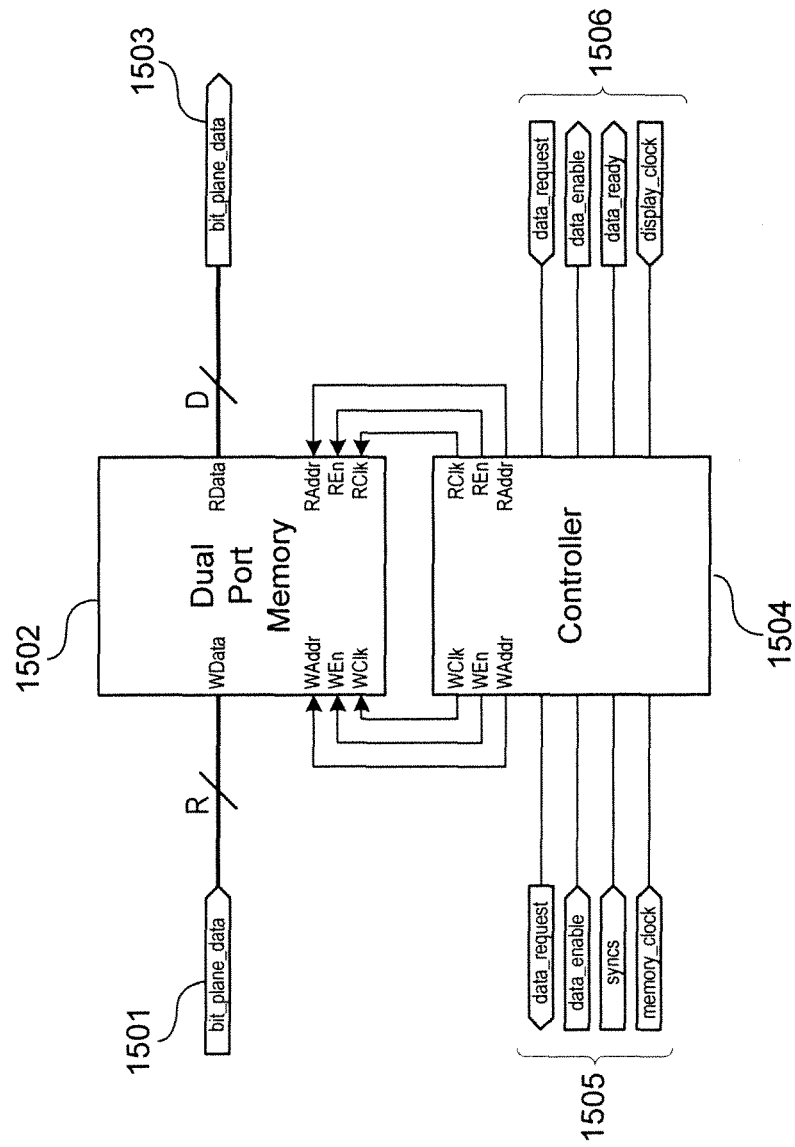
FIG. 15 shows a block diagram of a read buffer.

FIG. 15 shows a block diagram of a read buffer. Referring to FIG. 15, bit plane data 1501 are the input to dual-port memory 1502. The bit plane data is R bits wide. Bit plane data 1503 is the output from the read buffer. Synchronization signals 1505 and 1506 are used to control the transport of data into and out of the read buffer. Controller 1504 uses the incoming synchronization signals to generate write enable and write address for the write side of dual port memory 1502. Controller 1504 uses synchronization signals to generate read enable and read address for the read side of dual port memory 1502.

Figure 16:
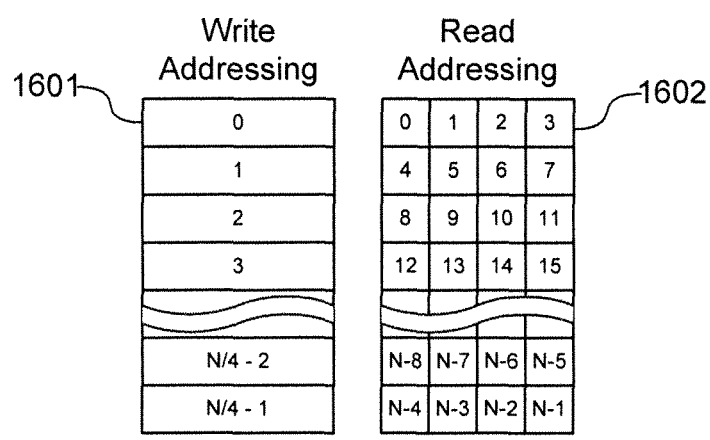
FIG. 16 shows an example dual-port memory address map that has one write address for every four read addresses.

Referring again to FIG. 15, one function of the dual-port memory 1502 is to translate from the data width R of the incoming bit plane data 1501 to the data width D of the outgoing bit plane data 1503. FIG. 16 shows an example dual-port memory address map that has one write address for every four read addresses. Referring to FIG. 16, the same memory is represented by write address map 1601 and read address map 1602. For example, data written to write address 0 can be read from read addresses 0, 1, 2, and 3, as the concatenation of the four read data values. This is normal operation for dual-port memories with different data widths on the two ports, as will be apparent to one skilled in the art.

Typically, the memory locations in the read buffer's dual-port memory are logically divided into two buffers, each half the size of the total memory. These buffers are used in a ping-pong fashion, with one being written to and the other being read. The buffers are swapped (write becomes read and vice versa) when incoming data has completely filled the buffer that is being used for writing. At any point in time, one buffer is used for reading and the other is used for writing. After the buffer used for writing is full, the roles of the two buffers are swapped. Referring again to FIG. 15, the read buffer controller 1504 generates a data_request signal that indicated that space is available for writing to the dual-port memory 1502.

Instead of dividing the memory locations into two logical buffers, an alternate read buffer embodiment uses the dual-port memory as a first-in-first-out (FIFO) memory. This has the advantage that less total memory is needed, but control of the memory is more complicated.

Referring again to FIG. 3, during maximum bandwidth operation, the memory controller 303 must fill the half of read buffer 305 used for writes in less time than it takes the data to the display device to empty the half of the read buffer 302 used for reads, to prevent buffer overflow. Bit plane block data is streamed out of the read buffer (i.e. cannot be throttled or interrupted) and the read buffer must respond immediately. Data is burst into the read buffer 305 at a high rate from memory controller 303 when read buffer 305 is ready to accept it. The primary purpose of the read buffer 305 is to provides bit plane data continuously to the digital display device, even when the memory controller 303 is temporarily busy and cannot provide data to the read buffer. This can occur during memory write operations, as well as for required memory overhead operations, such as refresh and calibration. The read buffer 305 can also be used to convert from the bus width R of the memory controller 303 to the bus width D of the digital display device. Additional functions that may be included in the read buffer include vertical flip, horizontal flip, and reordering of lines of the image bit plane data.

A First Example Embodiment

Figure 23:
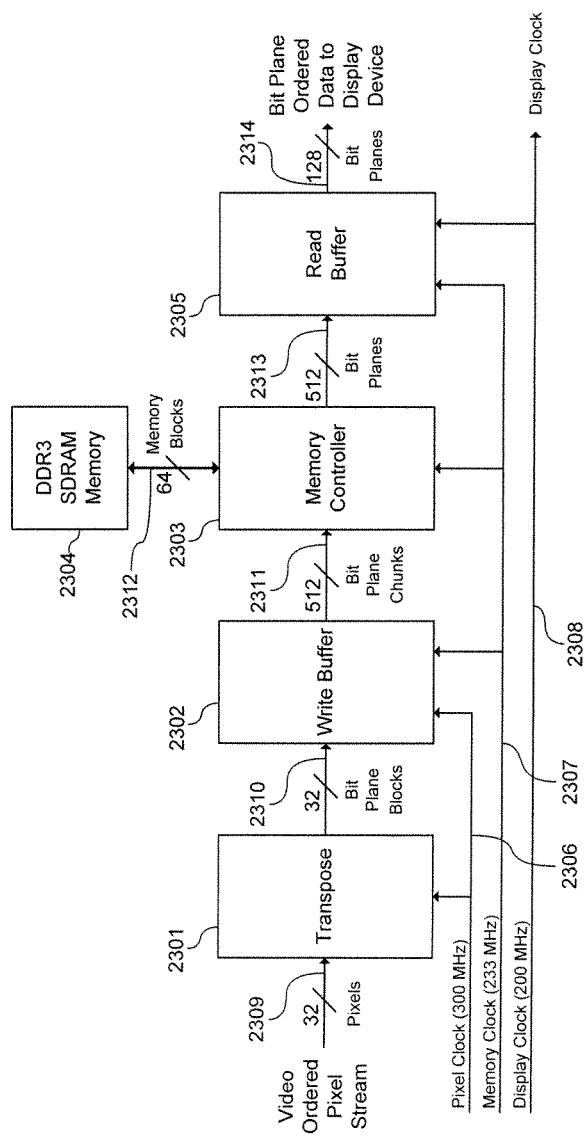
FIG. 23 shows a first example embodiment of the disclosure.

FIG. 23 shows a first example embodiment of the disclosure. Referring to FIG. 23, this example system processes 32-bit pixels 2309 and uses one rank of 64-bit DDR3 SDRAM 2304. Typically, multiple DDR3 memory chips are used in parallel, e.g. (4) 16-bit DDR3 chips for a 64-bit bus. Bit plane ordered data 2314 is supplied to a digital display device by a 128 bit bus. All signal processing is synchronized by one or more clock signals. Other data sizes and SDRAM sizes and types could be used, as will be apparent to those skilled in the art.

Referring to FIG. 23, the transformation of video ordered pixel data to bit plane data occurs in a cascade of operations. The first stage of the cascade operation is performed in the 32-bit transpose 2301, which transposes video ordered pixels of 32 bits 2309 into bit plane blocks of 32 pixels 2310. The second stage of the cascade operation is performed by write buffer 2302, which gathers 32-pixel wide bit plane blocks 2310 into 512-pixel wide bit plane chunks 2311. The input to the write buffer is 32 bits wide, matching the output of the transpose. The output from the write buffer is 512 bits wide 2311, matching the input of memory controller 2303. The memory controller, in conjunction with the DDR3

SDRAM 2304, performs the third stage of the cascade operation. Using a scatter writing and reading scheme, the memory controller scatter-writes bit plane chunks of width W=512 from the write buffer 2302 to SDRAM 2304 in chunk order, such that subsequent reading from the SDRAM in bit plane order results in contiguous, full frame bit planes of data. The fourth stage is read buffer 2305, which provides data continuously to the digital display device, even when the memory controller 2303 is temporarily busy and cannot provide data to the read buffer. This can occur during memory write operations, as well as for required memory overhead operations, such as refresh and calibration. The read buffer also converts from the 512 bit bus of the memory controller to the 128 bit bus 2314 of the digital display device. Other combinations of data widths could be used at each stage of the cascade, as will be apparent to those skilled in the art. Also double-data-rate (DDR) techniques may be used to reduce the number of interconnecting signals.

A Second Example Embodiment

Figure 24:
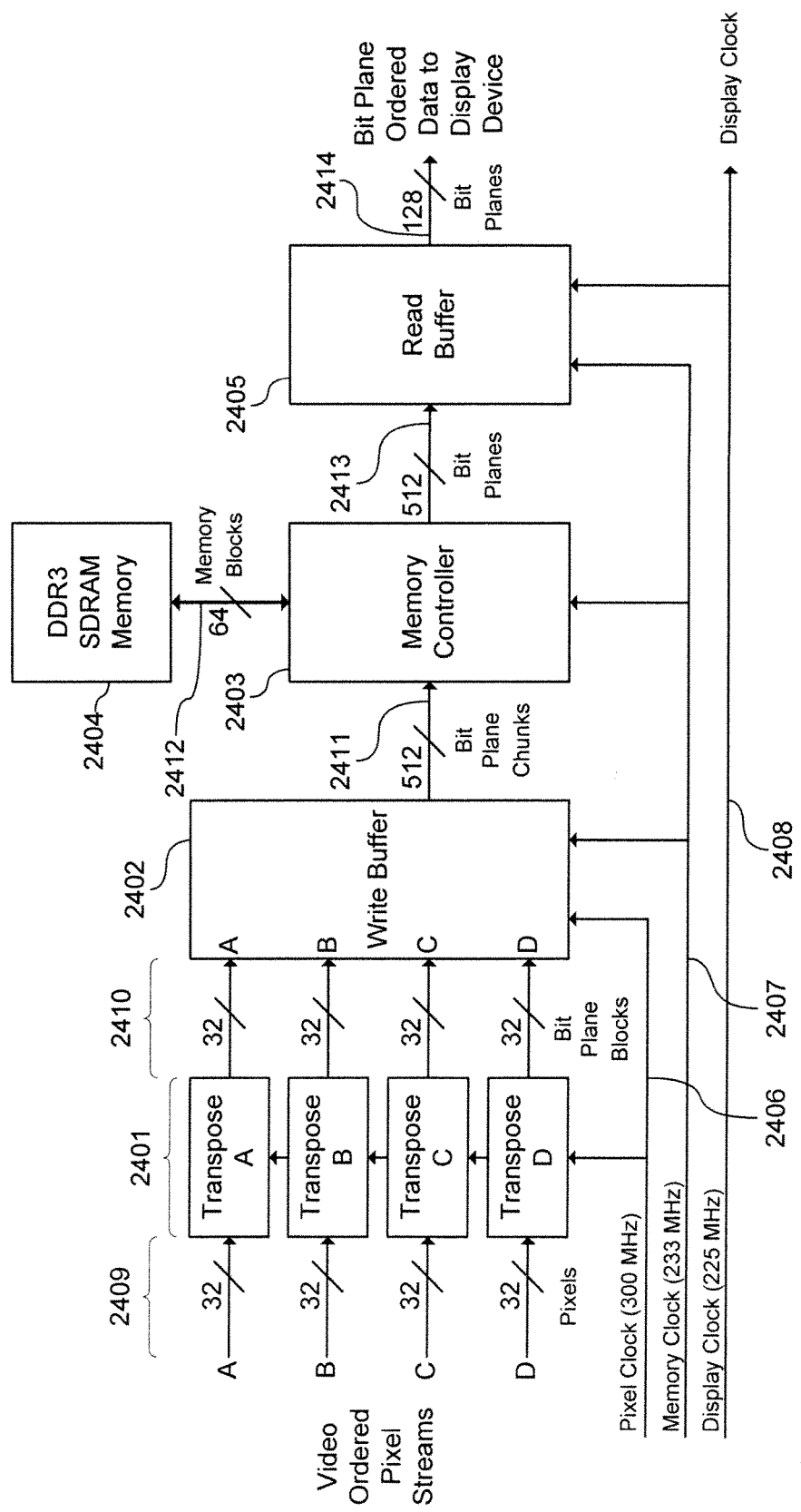
FIG. 24 shows a second example embodiment of the disclosure.

FIG. 24 shows a second example embodiment of the disclosure. Referring to FIG. 24, this example system processes four 32-bit pixel streams 2409 and uses one rank of 64-bit DDR3 SDRAM 2304. Typically, multiple DDR3 memory chips are used in parallel, e.g. (4) 16-bit DDR3 chips for a 64-bit bus. Bit plane ordered data 2414 is supplied to a digital display device by a 128 bit bus. For this example, a 4096×2160 pixel display will be assumed. All signal processing is synchronized by one or more clock signals. Other data sizes and SDRAM sizes and types could be used, as will be apparent to those skilled in the art.

Referring to FIG. 24, the transformation of video ordered pixel data to bit plane data occurs in a cascade of operations. The first stage of the cascade operation is performed in the four 32-bit transpose modules 2401, each of which transposes video ordered pixels of 32 bits 2409 into bit plane blocks of 32 pixels 2410, for a total of 128 bits of bit plane block data per pixel clock 2406. The second stage of the cascade operation is performed by write buffer 2402, which gathers four 32-pixel wide bit plane blocks 2410 into 512-pixel wide bit plane chunks 2411. Each of the four inputs to the write buffer is 32 bits wide, matching the output of the transpose modules. The output from the write buffer is 512 bits wide 2411, matching the input of memory controller 2403. The memory controller, in conjunction with the DDR3 SDRAM 2404, performs the third stage of the cascade operation. Using a scatter writing and reading scheme, the memory controller scatter-writes bit plane chunks of width W=512 from the write buffer 2402 to SDRAM 2404 in chunk order, such that subsequent reading from the SDRAM in bit plane order results in contiguous, full frame bit planes of data. The fourth stage is read buffer 2405, which provides data continuously to the digital display device, even when the memory controller 2403 is temporarily busy and cannot provide data to the read buffer. This can occur during memory write operations, as well as for required memory overhead operations, such as refresh and calibration. The read buffer also converts from the 512 bit bus of the memory controller to the 128 bit bus 2414 of the digital display device. Other combinations of data widths could be used at each stage of the cascade, as will be apparent to those skilled in the art. Also double-data-rate (DDR) techniques may be used to reduce the number of interconnecting signals.

In general, the write buffer is sized as small as possible to gather transpose blocks into bit plane chunks. An additional constraint on the minimum logical buffer size for the write buffer is that low level SDRAM activities, such as refresh and periodic read calibration, can preempt reading from the write buffer. This can result in write buffer overflow and must be avoided. Referring to FIG. 24, the write buffer accepts bit plane blocks 2410 with an aggregate width T=128, clocked at 300 MHz by Pixel Clock 2406. The write buffer outputs bit plane chunks 2411 with a width W=512, clocked at 233 MHz by Memory Clock 2407. The number of bit planes is N=32. The minimum size of a logical buffer in the write buffer is given by 128=N*W/T bit plane blocks, or by 32=N bit plane chunks. To write 128 blocks into the write buffer is $t_W$=128/300 MHz, or about 427 ns. To read 32 chunks from the write buffer is $t_R$=32/233 MHz, or about 137 ns. If $t_{OH}$ is the worst case duration of low level overhead operations, then $t_{OH}$ must be less than 290 ns= ($t_W$–$t_R$) to avoid write buffer overflow. Since DDR3 SDRAM has a worst case $t_{OH}$ of about 300 ns, the size of the logical buffers must be increased above the minimum for gathering bit plane blocks into bit plane chunks. Increasing the size of the logical buffers, usually by an integer factor (i.e. 2) gives extra time for interruptions from low level operations. In this example embodiment the write buffer size is doubled to allow for low level SDRAM operations.

Figure 25:
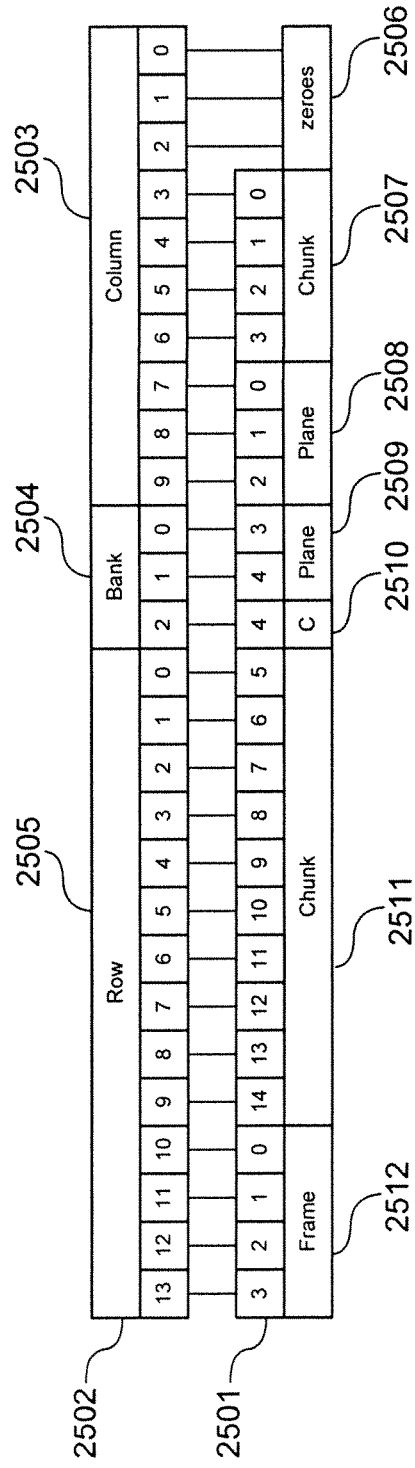
FIG. 25 shows an SDRAM address mapping.

The DDR3 SDRAM 2404 includes four 2 Gbit DDR3 SDRAM parts, each organized as 128M×16 and operating at 933 MHz. DDR3 SDRAM with an I/O bus width of n bits has a prefetch buffer size of 8n (i.e. eight data words per memory access), resulting in a burst size of 8 words per memory access. For an SDRAM of width 64 and operated in a burst 8 mode, a block of 512 bits is the smallest block that can be uniquely addressed. Since for highest possible system performance, bit plane memory overhead must be minimized, care must be taken in how bit planes are mapped in to the SDRAM address space. This memory map must be defined in such a way that both write and read access to the SDRAM can occur without interruption when SDRAM bank and row address changes are required. A mapping that accomplishes this is shown in FIG. 25. Referring to FIG. 25, SDRAM address signals 2502 are divided into three classes: column address signals Column[9:0] 2503, bank address signals Bank[2:0] 2504, and row address signals Row[13:0] 2505. Bit plane chunk number Chunk[14:0], bit plane number Plane[4:0] and frame count Frame[3:0] are used to drive the SDRAM address signals as follows: The least significant three column address signals, Column[2:0], are set to zeroes 2506. Column[6:3] are driven Chunk[3:0] 2507. Column[9:7] are driven by Plane[2:0] 2508. Bank[1:0] is driven by Plane[4:3] 2509. Bank[2] is driven by Chunk[4] 2510. Row[9:0] is driven by Chunk[14:5] 2513. Row[13:10] is driven by Frame[3:0] 2514.

FIG. 26 shows a mapping of bit plane number and chunk number to SDRAM locations resulting from the connections of FIG. 25. Referring to FIG. 26, the intersection of the column labeled AddrH and the row labeled AddrL represents memory location at address=AddrH+AddrL. The entry is in the form 'plane.chunk' where plane represents the bit plane number and chunk represents the bit plane chunk number. For example, the intersection of AddrH=128 and AddrL=33 contains 10.01, meaning that bit plane 10 chunk number 1 is stored at memory location 161.

Assuming a 4096 wide by 2160 high display device, there are 8 bit plane chunks per bit plane per display row (i.e. video line). There are 17280 bit plane chunks per frame per bit plane. Each DDR3 SDRAM row is logically divided into 8 slots. Each slot holds 16 bit plane chunks, where each bit plane chunk contains 512 bits of a single bit plane. Each slot is used for a different bit plane. DDR3 SDRAM banks are grouped into sets. Set 1 consists of banks 0 and 4. Set 2 consists of banks 1 and 5. Set 3 consists of banks 2 and 6. Set 4 consists of banks 3 and 7. Each memory bank set is used for different bit planes. For all video frames, set 1 holds bit planes 0 to 7. Set 2 holds bit planes 8 to 15. Set 3 holds bit planes 16 to 23. Set 4 holds bit planes 24 to 31. For memory writes, bank usage order is 0, 1, 2, 3, 0, 1, 2, 3 . . . until 32 bit plane block of every bit plane have been written and then 4, 5, 6, 7, 4, 5, 6, 7 . . . for the next 32 bit plane blocks of every bit plane. Then the bank usage pattern repeats. For memory reads, bank usage order is 0, 4, 0, 4 . . . or 1, 5, 1, 5 . . . or 2, 6, 2, 6 . . . or 3, 7, 3, 7 . . . depending on which bit plane is being fetched. The above given memory bank usage pattern allows seamless memory bank changes (no overhead) for both reads and writes.

FIG. 27 shows the order in which bit plane chunks are written into the DDR3 SDRAM. Referring to FIG. 27, only 8 writes into the DDR3 SDRAM are performed before a bank change is required. Four DDR3 SDRAM banks are used in sequence before reusing a bank. This time spent between writes to the same bank is used to hide the bank setup time.

FIG. 28 shows the order in which bit plane chunks are read from the DDR3 SDRAM. Referring to FIG. 28, sixteen reads from DDR3 SDRAM are performed before a bank change, allowing cycling between only two banks while providing adequate time to fully hide the bank setup time for reads.

DDR3 SDRAM write address generation is based on video counters (memory block, line and frame counters) that are advanced by incoming video syncs. DDR3 SDRAM read address generation is based on bit plane and display device data requests from the display device controller and on a read memory block counter that counts memory block reads since a display device controller request. The read memory block counter is reset upon a new display device controller request.

The read buffer is sized large enough to buffer up enough data to deliver a continuous stream of bit plane data to the display device while constantly being interrupted by burst of write data into the SDRAM. For maximum performance, the read buffer must be large enough that one read buffer worth of data delivered to the display device spans at least one input video line. This allows the input video horizontal blanking time to be used to prevent the read buffer from under-flowing during maximum DDR3 SDRAM bandwidth operation.

REFERENCES

U.S. Patent Documents

U.S. Pat. No. 5,255,100
U.S. Pat. No. 5,663,749
U.S. Pat. No. 6,118,500

Other Documents

Paeth, A. W. (1986) "A Fast Algorithm for General Raster Rotation," *Proceedings, Graphics Interface '86*, Canadian Information Processing Society, Vancouver, pp 77-81

Morton, G. M. (1966), *A computer Oriented Geodetic Data Base; and a New Technique in File Sequencing*, Technical Report, Ottawa, Canada: IBM Ltd.

What is claimed is:

1. A data processing system comprising:
    a transpose system configured to receive video ordered pixel data and to generate bit plane blocks of data using a shift register that delays each pixel of a plurality of pixels by a different amount;
    a write buffer configured to receive the bit plane blocks of data using a pixel clock having a first clock rate and to generate bit plane data frames using a memory clock having a second clock rate;
    a memory controller configured to receive the bit plane data frames and to write a first bit plane data frame to a memory while simultaneously reading a second bit plane data frame from memory; and
    a read buffer configured to receive the second bit plane data frame and to convert the second bit plane data frame to a digital display device format;
    wherein the memory controller is configured to use a scatter reading and writing process to write the first bit plane data frame to the memory while simultaneously reading the second bit plane data frame from the memory to perform a third stage of a cascade operation to write bit plane chunks from the write buffer to memory in chunk order and to subsequently read contiguous, full frame bit planes of data from the memory in a bit plane order.

2. The data processing system of claim 1 wherein the memory is no larger than two frames of video data and the memory controller arbitrates between writes and reads to the memory.

3. The data processing system of claim 1 wherein the memory comprises a Double Data Rate 3 Synchronous Dynamic Random Access Memory block.

4. The data processing system of claim 1 wherein the input to the write buffer is wider than the output of the write buffer.

5. The data processing system of claim 4 wherein the memory controller assigns a lowest priority to bit plane data writes, a medium priority to bit plane data writes and a highest priority to low level memory functions, and arbitrates between writes and reads to the memory based on priority.

6. The data processing system of claim 1 wherein the read buffer is coupled to a memory clock and to a display clock, and the memory controller arbitrates operations involving the memory based on a priority, where the priority is in inverse order to a length of time each operation takes.

7. The data processing system of claim 6 wherein the first clock rate and the second clock rate are different from a third clock rate of the display clock.

8. The data processing system of claim 1 wherein the transpose system further comprises:
    a plurality of delays, each delay having a different delay value; and
    a barrel shifting circuit coupled to the plurality of delays.

9. The data processing system of claim 1 wherein the transpose system further comprises:
    a first plurality of delays;
    a barrel shifting circuit having an input coupled to the first plurality of delays and an output; and
    a second plurality of delays coupled to the barrel shifting circuit.

10. The data processing system of claim 1 wherein the transpose system further comprises:
    a first delay having a delay value of zero;
    a second delay having a delay value of one; and a barrel shifting circuit coupled to the first delay and the second delay.

11. The data processing system of claim 1 wherein the write buffer is coupled to a pixel clock and to a memory clock, and the read buffer is coupled to the memory clock and to a display clock.

12. The data processing system of claim 7 wherein the first clock rate is different from a display clock rate, and the display clock rate is different from the second clock rate.

13. The data processing system of claim 1 wherein the transpose buffer comprises a plurality of parallel transpose buffers that each receive a separate stream of video ordered pixel data and the memory controller performs a third stage of a cascade operation.

14. In a data processing system having a transpose system configured to receive video ordered pixel data and to generate bit plane blocks of data, a write buffer configured to receive the bit plane blocks of data and to generate bit plane data frames, a memory controller configured to receive the bit plane data frames and to write a first bit plane data frame to a memory while simultaneously reading a second bit plane data frame from memory, a read buffer configured to receive the second bit plane data frame and to convert the second bit plane data frame to a digital display device format, wherein the memory is no larger than two frames of video data, wherein the memory comprises a Double Data Rate 3 Synchronous Dynamic Random Access Memory block, wherein the memory controller uses a scatter reading and writing process to write the first bit plane data frame to the memory while simultaneously reading the second bit plane data frame from the memory, wherein the write buffer is coupled to a first pixel clock and to a second memory clock, wherein a first pixel clock rate is different from a second memory clock rate, wherein the read buffer is coupled to a first memory clock and to a second display clock, wherein a first memory clock rate is different from a second display clock rate, wherein the transpose system includes a plurality of delays, a barrel shifting circuit coupled to the plurality of delays, and a second plurality of delays coupled to the barrel shifting circuit, wherein the plurality of delays includes a first delay having a delay value of zero and a second delay having a delay value of one, wherein the write buffer is coupled to a first pixel clock and to a second memory clock, and the read buffer is coupled to the second memory clock and to a third display clock, and wherein the transpose buffer comprises a plurality of parallel transpose buffers that each receive a separate stream of video ordered pixel data, a method, comprising:
  receiving the video ordered pixel data at the transpose system and generating the bit plane blocks of data with the transpose system;
  receiving the bit plane blocks of data at the write buffer and generating the bit plane data frames with the write buffer;
  receiving the bit plane data frames at the memory controller and writing the first bit plane data frame to the memory while simultaneously reading the second bit plane data frame from memory using the memory controller;
  receiving the second bit plane data frame at a read buffer and converting the second bit plane data frame to a digital display device format using the read buffer;
  wherein writing the first bit plane data frame to the memory while simultaneously reading the second bit plane data frame from memory using the memory controller comprises using the scatter reading and writing process to write the first bit plane data frame to the memory while simultaneously reading the second bit plane data frame from the memory;
  receiving the first pixel clock signal and the second memory clock signal at the write buffer;
  wherein the first pixel clock signal is received at a different rate than the second memory clock rate signal; and
  wherein generating the bit plane blocks of data with the transpose system comprises:
    delaying different bits of the video ordered pixel data with the plurality of delays; and
    shifting the different bits of delayed video ordered pixel data with the barrel shifting circuit.

15. A data processing system comprising:
  a transpose system configured to receive video ordered pixel data and to generate bit plane blocks of data using a shift register that delays each pixel of a plurality of pixels by a different amount;
  a write buffer configured to receive the bit plane blocks of data using a pixel clock having a first clock rate and to generate bit plane data frames using a memory clock having a second clock rate;
  a memory controller configured to receive the bit plane data frames and to write a first bit plane data frame to a memory while simultaneously reading a second bit plane data frame from memory; and
  a read buffer configured to receive the second bit plane data frame and to convert the second bit plane data frame to a digital display device format;
  wherein the read buffer is coupled to a memory clock and to a display clock, and the memory controller arbitrates operations involving the memory based on a priority, where the priority is in inverse order to a length of time each operation takes;
  wherein the first clock rate and the second clock rate are different from a third clock rate of the display clock.

16. The data processing system of claim 15 wherein the memory is no larger than two frames of video data and the memory controller arbitrates between writes and reads to the memory.

17. The data processing system of claim 15 wherein the memory comprises a Double Data Rate 3 Synchronous Dynamic Random Access Memory block.

18. The data processing system of claim 15 wherein the input to the write buffer is wider than the output of the write buffer.

19. The data processing system of claim 18 wherein the memory controller assigns a lowest priority to bit plane data writes, a medium priority to bit plane data writes and a highest priority to low level memory functions, and arbitrates between writes and reads to the memory based on priority.

20. The data processing system of claim 15 wherein the transpose system further comprises:
  a plurality of delays, each delay having a different delay value; and
  a barrel shifting circuit coupled to the plurality of delays.

* * * * *